United States Patent
Woo et al.

(10) Patent No.: US 11,080,386 B2
(45) Date of Patent: Aug. 3, 2021

(54) METHOD FOR PROVIDING SMART KEY SERVICE AND ELECTRONIC DEVICE THEREOF

(71) Applicant: Samsung Electronics Co., Ltd., Gyeonggi-do (KR)

(72) Inventors: Jeong Woo, Gyeonggi-do (KR); Soon Jae Park, Gyeonggi-do (KR); Hojung Lee, Seoul (KR); Sunghyun Kim, Gyeonggi-do (KR); So-Young Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 271 days.

(21) Appl. No.: 16/033,670

(22) Filed: Jul. 12, 2018

(65) Prior Publication Data

US 2019/0065732 A1 Feb. 28, 2019

(30) Foreign Application Priority Data

Aug. 31, 2017 (KR) .......................... 10-2017-0110894

(51) Int. Cl.
*G06F 21/44* (2013.01)
*G06F 1/3296* (2019.01)
(Continued)

(52) U.S. Cl.
CPC ............ *G06F 21/44* (2013.01); *G06F 1/3212* (2013.01); *G06F 1/3287* (2013.01);
(Continued)

(58) Field of Classification Search
CPC ...... G06F 21/44; G06F 1/3287; G06F 1/3212; G06F 1/3293; G06F 21/35; G06F 1/3296;
(Continued)

(56) References Cited

U.S. PATENT DOCUMENTS 10,538,220 B1\* 1/2020 Tyagi ..................... B60R 25/24
10,793,108 B2\* 10/2020 Gersabeck ............ B60R 25/209
(Continued)

FOREIGN PATENT DOCUMENTS

KR   10-2014-0090728     7/2014
KR       101459967      11/2014
(Continued)

OTHER PUBLICATIONS

European Search Report dated Jun. 19, 2020 issued in counterpart application No. 18849984.2-1218, 5 pages.
(Continued)

*Primary Examiner* — Jung W Kim
*Assistant Examiner* — Thomas Ho
(74) *Attorney, Agent, or Firm* — The Farrell Law Firm, P.C.

(57) ABSTRACT

An electronic device including a first memory configured to store authorization information; a first processor configured to access the first memory; a second memory; and a second processor configured to access the second memory. The first processor is configured to check state information related to a battery state of the electronic device while the electronic device is in a first state; if the state information satisfies a first specified condition, provide authorization information to an external device in the first state so that the external device performs authorization using the authorization information; and if the state information satisfies a second specified condition, copy the authorization information into the second memory in the first state and convert the electronic device to a second state in which power consumption thereof is less than that in the first state. The second processor is configured to provide the authorization information to the external device in the second state so that the
(Continued)

external device performs authorization using the authorization information.

9 Claims, 17 Drawing Sheets

(51) Int. Cl.
G06F 1/3287 (2019.01)
G06F 1/3212 (2019.01)
G06F 1/3293 (2019.01)
G06F 21/35 (2013.01)

(52) U.S. Cl.
CPC .......... *G06F 1/3293* (2013.01); *G06F 1/3296* (2013.01); *G06F 21/35* (2013.01); *G06F 2221/2139* (2013.01)

(58) Field of Classification Search
CPC .......... G06F 2221/2139; B60R 16/023; B60R 16/0315; B60R 16/033; B60R 25/10; H04W 12/06; H04W 52/0261
See application file for complete search history.

(56) References Cited

U.S. PATENT DOCUMENTS

| | | | |
|---|---|---|---|
| 2009/0243796 A1* | 10/2009 | Tieman | B60R 25/24 340/5.72 |
| 2011/0148750 A1* | 6/2011 | Ayala | G06F 3/147 345/107 |
| 2013/0040662 A1* | 2/2013 | Eliseo | H04W 52/027 455/456.3 |
| 2013/0237174 A1* | 9/2013 | Gusikhin | H04W 4/90 455/404.1 |
| 2014/0176304 A1 | 6/2014 | Park | |
| 2014/0232322 A1* | 8/2014 | Kracker | H02J 7/342 320/103 |
| 2015/0130588 A1 | 5/2015 | Lee | |
| 2016/0029316 A1* | 1/2016 | Mohan | H04M 3/4365 455/417 |
| 2016/0059726 A1 | 3/2016 | Berman et al. | |
| 2016/0124674 A1 | 5/2016 | Seo et al. | |
| 2016/0132099 A1* | 5/2016 | Grabau | G06F 1/3287 713/323 |
| 2016/0247437 A1 | 8/2016 | Choi et al. | |
| 2016/0275480 A1 | 9/2016 | Sanaboyina et al. | |
| 2016/0278067 A1* | 9/2016 | Badam | G06F 1/3275 |
| 2016/0295507 A1* | 10/2016 | Sengupta | H04W 4/80 |
| 2017/0070346 A1* | 3/2017 | Lombardi | H04L 63/0428 |
| 2017/0168555 A1* | 6/2017 | Munoz | A61B 5/0205 |
| 2017/0174178 A1* | 6/2017 | Nixon | E05B 81/64 |
| 2017/0177067 A1 | 6/2017 | Okada et al. | |
| 2018/0326947 A1* | 11/2018 | Oesterling | G07C 9/00571 |

FOREIGN PATENT DOCUMENTS

KR  20160052240  5/2016
KR  20160102730  8/2016

OTHER PUBLICATIONS

International Search Report dated Oct. 16, 2018 issued in counterpart application No. PCT/KR2018/007978, 3 pages.
Written Opinion dated Oct. 16, 2018 issued in counterpart application No. PCT/KR2018/007978, 7 pages.

* cited by examiner

METHOD FOR PROVIDING SMART KEY SERVICE AND ELECTRONIC DEVICE THEREOF

CROSS-REFERENCE TO RELATED APPLICATION(S)

This application is based on and claims priority under 35 U.S.C. § 119 to Korean Patent Application No. 10-2017-0110894, filed on Aug. 31, 2017, in the Korean Intellectual Property Office, the entire disclosure of which is incorporated herein by reference.

BACKGROUND

1. Field

The present disclosure relates to a device and a method for reducing power consumption in an electronic device providing a smart key service.

2. Description of Related Art

With recent developments in information communication technology and semi-conductor technology, various types of electronic devices have evolved to become devices providing a variety of services. For example, the various services may include at least one of a voice call service, a text messaging service, a broadcasting service, a wireless Internet service, a camera service, an electronic payment service, or a smart key service.

An electronic device may provide a smart key service for a registered vehicle in a case where a smart key application is installed. For example, when an electronic device approaches a vehicle or detects an input of selecting an icon for lock release, the electronic device may transmit a lock release signal in order to unlock the vehicle. When the lock release signal received from the electronic device is determined to be valid, the vehicle may release the lock.

SUMMARY

A smart key service may be limited in an electronic device because of a limited amount of power of a battery. For example, when the remaining power of a battery in the electronic device falls below a reference remaining power thereof, the operation (e.g., a communication function) of the electronic device may be limited, thereby limiting the usage of the smart key service.

When the usage of the smart key service is limited in the electronic device, a user of the electronic device cannot control the vehicle, which may cause inconvenience in which the vehicle is of limited use.

An aspect of the present disclosure provides a device and a method for increasing a time for which a smart key service is provided in an electronic device.

Another aspect of the present disclosure provides a device and a method for reducing power consumption of an electronic device to provide a smart key service in an electronic device.

In accordance with an aspect of the present disclosure, an electronic device is provided. The electronic device includes a first memory configured to store authorization information; a first processor configured to access the first memory; a second memory; and a second processor configured to access the second memory, wherein the first processor is configured to check state information related to a battery state of the electronic device while the electronic device is in a first state; if the state information satisfies a first condition, provide authorization information to an external device in the first state so that the external device performs authorization using the authorization information; and if the state information satisfies a second condition, copy the authorization information into the second memory in the first state and convert the electronic device to a second state in which power consumption thereof is less than that in the first state, and wherein the second processor is configured to provide the authorization information to the external device in the second state so that the external device performs authorization using the authorization information.

In accordance with another aspect of the present disclosure, an electronic device is provided. The electronic device includes a memory configured to store authorization information; and a processor configured to access the memory, wherein the processor is configured to check state information related to a battery state of the electronic device while the electronic device is operating based on a first operating system; if the state information satisfies a first condition, provide authorization information to an external device while the electronic device is operating based on the first operating system so that the external device performs authorization using the authorization information; and if the state information satisfies a second condition, convert the electronic device from the first operating system to a second operating system having power consumption less than that of the first operating system and provide the authorization information to the external device so that the external device performs authorization using the authorization information.

In accordance with another aspect of the present disclosure, an electronic device is provided. The electronic device includes a first memory; a first processor; a second processor configured to have power consumption less than that of the first processor; and a second memory configured to be accessed by the second processor, wherein the first processor is configured to check state information of a battery of the electronic device; based on the state information of the battery, determine whether or not to transmit driving information of the second processor; and based on the determination of transmission of the driving information of the second processor, store the driving information of the second processor, which is stored in the first memory, in the second memory, and wherein the second processor is configured to, based on the driving information of the second processor, which is stored in the second memory, transmit authorization information to an external device; and wherein the first processor is further configured to be terminated at a time at which the second processor is driven.

According to various embodiments of the present disclosure, the operations of an electronic device may include: checking state information of a battery of the electronic device through a first processor of the electronic device; based on the state information of the battery, determining whether or not to transmit driving information of a second processor; based on the determination of transmission of the driving information of the second processor, storing the driving information of the second processor, which is stored in a first memory of the electronic device, in a second memory that the second processor can access; and based on the driving information of the second processor, which is stored in the second memory, transmitting authorization information to an external device through the second processor of the electronic device, wherein the first processor is configured to be terminated at the time at which the second processor is driven.

BRIEF DESCRIPTION OF THE DRAWINGS

The above and other aspects, features, and advantages, of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. Further, in the following description of the present disclosure, a detailed description of known functions and configurations incorporated herein are omitted when it may make the subject matter of the present disclosure rather unclear. The terms which are described below are terms defined in consideration of functions in the present disclosure, and may be different according to users, intentions of the users, or customs. Therefore, definitions of the terms should be made based on the contents throughout the present disclosure.

Figure 1:
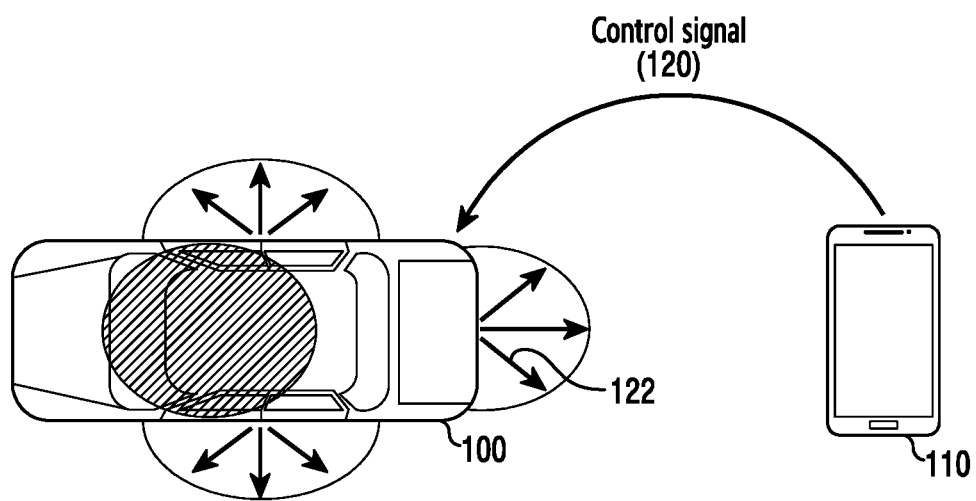
FIG. 1 is a system for providing a smart key service according to an embodiment.

FIG. 1 is a system for providing a smart key service according to an embodiment. Although the following description is of a vehicle as an example of a first electronic device 100, the description may also be applied to other devices equipped with a digital door lock (or an electronic door lock).

Referring to FIG. 1, a second electronic device 110 may support a smart key service for controlling the first electronic device 100 (e.g., a vehicle). For example, when detecting an input of selecting an icon for lock release, the second electronic device 110 may transmit a control signal 120 for lock release to the first electronic device 100. If the control signal 120 for lock release is determined to be reliable, the first electronic device 100 may release the lock (for example, the door lock). For example, the reliability of the control signal 120 for lock release may be determined by authorization of the second electronic device 110 using the control signal 120 for lock release. For example, if the authorization of the second electronic device 110 is successful, the first electronic device 100 may determine that the control signal 120 for lock release is reliable. For example, the first electronic device 100 may periodically transmit a lock release request signal 122. If the lock release request signal 122 is determined to be reliable, the second electronic device 110 may transmit a control signal 120 for lock release to the first electronic device 100. If the control signal 120 for lock release is determined to be reliable, the first electronic device 100 may release the lock. For example, the reliability of the lock release request signal 122 may be determined by authorization of the first electronic device 100 using the lock release request signal 122. For example, if the authorization of the first electronic device 100 is successful, the second electronic device 110 may determine that the lock release request signal 122 is reliable.

According to an embodiment, the second electronic device 110 may control power supplied to internal modules included in the second electronic device 110 so as to extend the usage time of a smart key. For example, the second electronic device 110 may cut off the power supplied to the remaining internal modules, except for at least one internal module related to a smart key service, among a plurality of internal modules included in the second electronic device 110.

According to an embodiment, the second electronic device 110 may change the operating system of the second electronic device 110 so as to extend the usage time of a smart key. For example, when the remaining power or level of a battery of the second electronic device 110 is less than a predefined reference power or level of the battery, the second electronic device 110 may convert the operating system of the second electronic device 110 to a low-power operating system. For example, the low-power operating system may include an operating system configured to drive only at least one internal module related to a smart key service, among a plurality of internal modules included in the second electronic device 110. For example, the second electronic device 110 may cut off the power supplied to other internal modules that are not driven by the low-power operating system, among a plurality of internal modules included in the second electronic device 110.

According to an embodiment, the second electronic device 110 may change a driving processor of the second electronic device 110 so as to extend the usage time of a smart key. For example, when the remaining power of a battery of the second electronic 110 falls below a predefined reference power of the battery, the second electronic device 110 may convert the driving processor of the second electronic device 110 to a low-power processor. For example, the low-power processor may use a low-power operating system. The low-power processor may perform control so as to cut off the power supplied to the remaining internal modules, except for one or more internal modules related to a smart key service, among a plurality of internal modules included in the second electronic device 110.

Figure 2:
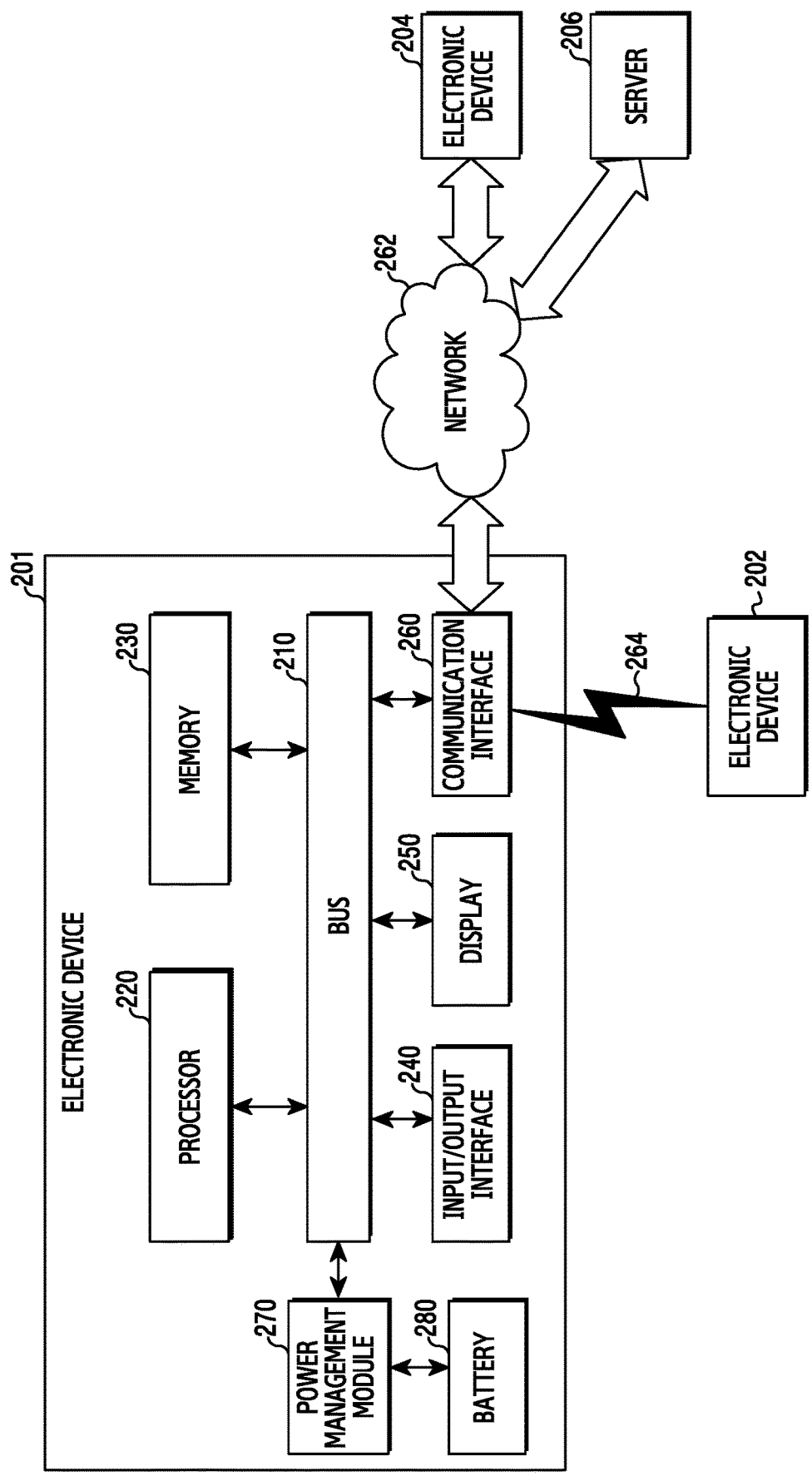
FIG. 2 is a block diagram of an electronic device for providing a smart key service according to an embodiment.

FIG. 2 is a block diagram of an electronic device 201 according to an embodiment. The electronic device 201 described below may include all or at least some of the elements of the second electronic device 110 in FIG. 1.

Referring to FIG. 2, the electronic device 201 may include a bus 210, a processor (e.g., including processing circuitry) 220, a memory 230, an input/output interface (e.g., including input/output circuitry) 240, a display 250, a communication interface (e.g., including communication circuitry) 260, a power management module (e.g., including power management circuitry) 270, and a battery 280. In an embodiment, the electronic device 201 may exclude at least one element, or may add other optional elements thereto.

The bus 210 may include a circuit for connecting the elements 220 to 280 to each other and transferring signals (e.g., control messages and/or data) between the elements 220 to 280.

The processor 220 may perform a calculation or data processing in relation to control and/or communication of one or more other elements of the electronic device 201. For example, the processor 220 may include at least one of a central processing unit (CPU), an application processor (AP), a communication processor (CP), and an image signal processor (ISP).

According to an embodiment, the processor 220 may perform control so as to provide a smart key service to an external device 202 (e.g., the first electronic device 100 in FIG. 1). For example, in a case where a smart key application is installed in the electronic device 201, the processor 220 may perform control so as to provide a smart key service to the external device 202 that is registered in the smart application. For example, when an occurrence of a lock release event is detected, the processor 220 may control the communication interface 260 so as to transmit a control signal for lock release to the external device 202. For example, the lock release event may be generated based on an input of selecting an icon for lock release or the reception of a lock release request signal.

According to an embodiment, the processor 220, based on a level or remaining power of the battery 280, may perform control so as to convert the operation mode of the electronic device 201 to a second mode (e.g., a low-power mode) for a smart key service. For example, the processor 220 may check the remaining power of the battery 280 through the power management module 270. The processor 220 may perform control so as to convert the operation mode of the electronic device 201 to a low-power mode for a smart key service when the remaining power of the battery 280 is less than a predefined reference power of the battery. For example, the predefined reference power of the battery may be determined by a user, or may include the remaining power of the battery (e.g., 5% or 2%) corresponding to a level in which other functions, except for the smart key service, cannot be provided.

According to an embodiment, the processor 220, based on the second mode for a smart key service, may control the power supplied to the elements 230 to 280 (e.g., internal modules) of the electronic device 201. For example, when the operation mode of the electronic device 201 is converted to a low-power mode, the processor 220 may control the power management module 280 so as to maintain the power supplied to at least some of the elements 230 to 280 of the electronic device 201, which are related to a smart key service. The processor 220 may control the power management module 280 so as to cut off the power supplied to the remaining elements. For example, at least some of the elements related to a smart key service may include at least one of the processor 220, the memory 230, or the communication interface 260. For example, the remaining elements may include at least one of the memory 230, the input/output interface 240, the display 250, or the communication interface 260.

According to an embodiment, the processor 220, based on the second mode for a smart key service, may convert the operating system of the electronic device 201 to a low-power operating system. For example, when the operation mode of the electronic device 201 is converted to the low-power mode, the processor 220 may convert the operating system of the electronic device 201 to a low-power sub-operating system through rebooting. The processor 220 may load at least some of the elements related to a smart key service, among the elements 230 to 280 of the electronic device 201, through a sub-operating system, thereby providing the smart key service. For example, the processor 220 may control the power management module 280 so as to cut off the power supplied to the remaining elements through the sub-operating system.

According to an embodiment, the processor 220, based on the second mode for a smart key service, may perform control such that a sub-processor is activated by low-power. For example, when the operation mode of the electronic device 201 is converted to a low-power mode, the processor 220 may transmit driving information stored in the memory 230 (e.g., a secure area) to a sub-processor. The processor 220 may initiate a driving termination procedure, and may transmit an activation signal to the sub-processor. When the sub-processor is activated based on the activation signal and the driving information received from the processor 220, the sub-processor may provide a smart key service using at least some of the elements related to the smart key service. For example, the sub-processor may be operated based on a sub-operating system driven by low power. For example, the sub-processor may include at least one element included in the processor 220.

According to an embodiment, the processor 220 (or sub-processor) may perform control so as to provide a smart key service to the external device 202 in the second mode. For example, when an input for selecting an icon corresponding to lock release is received, the processor 220 may activate a communication interface 260 that is driven in a low-power mode. The processor 220 may control the communication interface 260 so as to transmit a control signal for lock release to the external device 202. For example, when a lock release request signal is received through the communication interface 260, the processor 220 may perform authorization of the external device 202 that has transmitted the lock release request signal. If authorization of the external device 202 is successful, the processor 220 may control the communication interface 260 so as to transmit a control signal for lock release to the external device 202.

According to an embodiment, the processor 220 may control an indicator (e.g., a light-emitting diode (LED) device) so as to indicate the operation state of the electronic device 201 in a low-power mode in which the display 250 is deactivated. For example, when an occurrence of an event for lock release of the external device 202 is detected in the low-power mode, the processor 220, based on the event, may control the indicator so as to indicate the operation state of the electronic device 201. For example, the indicator may indicate the operation state of the electronic device 201 by adjusting at least one of a light-emission color, a number of light-emissions, a light-emission interval, or a light-emission pattern. For example, an event for lock release may be generated based on a user input for lock release of the external device 202 or based on a receipt of a request signal for lock release. The user input for lock release may include at least one of an icon selection input, an audio input, or a hardware button input, which corresponds to lock release.

According to an embodiment, when a connection of an external power source is detected in the low-power mode, the processor 220 may perform control so as to convert the operation mode of the electronic device 201 to a typical (e.g., normal) mode. For example, when the operation mode of the electronic device 201 is converted to the normal mode, the processor 220 may release the cutoff of the power supplied to at least one internal module. For example, when the operation mode of the electronic device 201 is converted to the normal mode, the processor 220 may restore the operating system of the electronic device 201 to the first operating system through a rebooting process. For example, when the operation mode of the electronic device 201 is converted to the normal mode, the sub-processor may perform control such that the processor 220 is activated.

The memory 230 may include a volatile and/or non-volatile memory. For example, the memory 230 may store commands or data in relation to one or more other elements of the electronic device 201. For example, the memory 230 may include a secure area for storing information requiring a security setting such as authorization information.

The input/output interface 240 may transfer commands or data received from a user or other external devices to other elements of the electronic device 201. For example, the input/output interface 240 may include one or more physical buttons such as a home button, a power button, and a volume control button. The input/output interface 240 may output commands or data received from other elements of the electronic device 201 to a user or other external devices. For example, the input/output interface 240 may include a speaker for outputting audio signals and a microphone for collecting audio signals.

The display 250 (e.g., a display device) may display a variety of contents (e.g., text, images, videos, icons, and/or symbols) to the user. The display 250, for example, may include a touch screen. The display 250 may receive a touch input, a gesture input, a proximity input, or a hovering input using electronic pens or a part of a user's body.

The communication interface 260 may establish communication between the electronic device 201 and the first external electronic device 202, the second external electronic device 204, or the server 206. For example, the communication interface 260 may be connected to the network 262 through wireless or wired communication to thus communicate with the second external electronic device 204 or the server 206. For example, the communication interface 260 may communicate with the first external electronic device 202 through short-range communication 264.

The power management module 270 may control the charging and discharging of the battery 280. For example, the power management module 270 may supply at least some of the power provided from an external power supply to the battery 280. For example, the power management module 270 may supply power to the elements (e.g., internal modules) of the electronic device 201. For example, the power management module 270, based on the control of the processor 220 or sub-processor, may supply power to at least one element related to a smart key service when the electronic device 201 operates in a low-power mode. The power management module 270 may cut off the power supplied to at least one remaining element that is not related to a smart key service. For example, the power management module 270 may include at least one of a power management integrated circuit (PMIC) and a charging circuit.

Figure 3A:
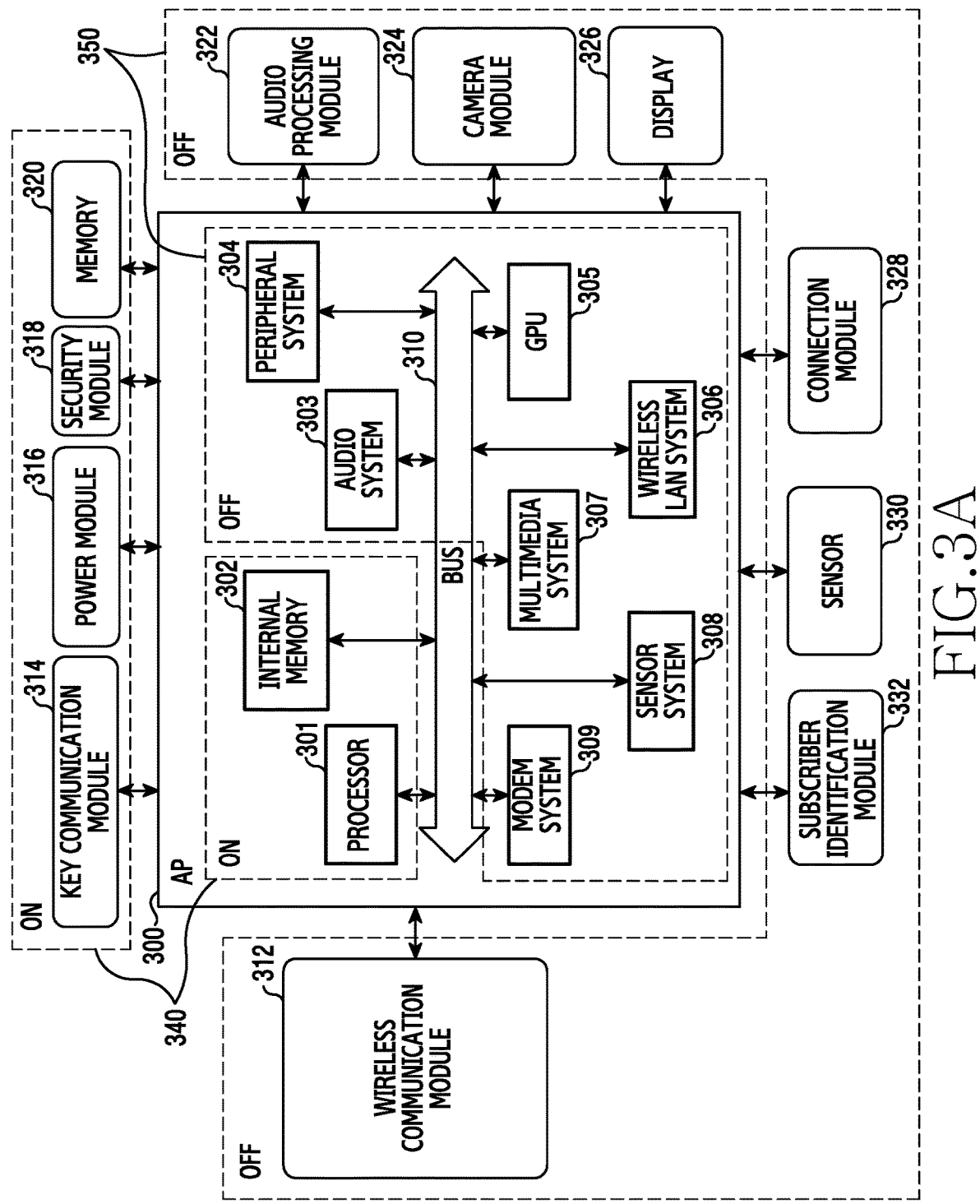
FIGS. 3A and 3B are block diagrams of an electronic device for controlling power supplied to internal modules in the electronic device according to an embodiment.
Figure 3B:
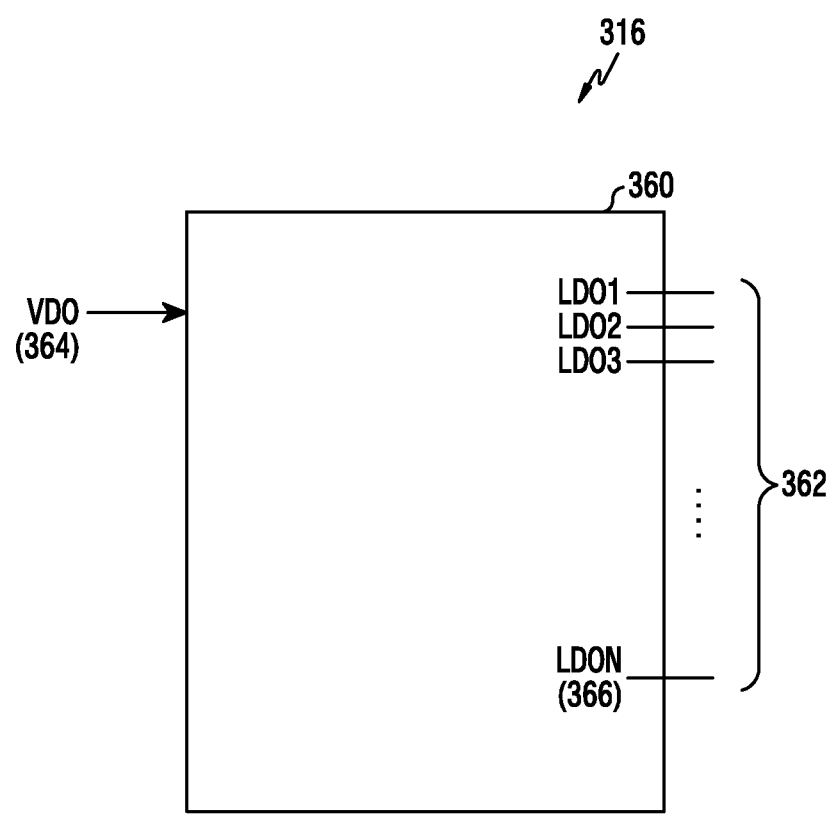

FIGS. 3A and 3B are block diagrams of an electronic device for controlling power supplied to internal modules in the electronic device according to an embodiment of the present disclosure. In the following description, the electronic device may include all or at least some of the electronic device 201 in FIG. 2.

Referring to FIG. 3A, the electronic device may include an AP 300, a wireless communication module 312, a key communication module 314, a power module 316, a security module 318, a memory 320, an audio processing module 322, a camera module 324, a display 326, a connection module 328, a sensor 330, and a subscriber identification module (SIM) 332.

According to an embodiment, the AP 300 (e.g., the processor 220 in FIG. 2) may control a plurality of hardware or software elements connected to the AP 300 by driving an operating system or applications. The AP 300 may process a variety of data and may perform arithmetic operations. The AP 300 may include a processor 301, an internal memory 302, an audio system 303, a peripheral system 304, a graphics processing unit (GPU) 305, a wireless local area network (LAN) system 306, a multimedia system 307, a sensor system 308, and a modem system 309.

According to an embodiment, the wireless communication module 312 may provide voice calls, video calls, text services, or Internet services through a communication network. For example, the wireless communication module 312 may include a radio frequency (RF) module and a CP capable of transmitting and receiving communication signals {e.g., RF signals}.

According to an embodiment, the key communication module 314 may provide communication with an external device (e.g., the first electronic device 100 in FIG. 1) for a smart key service. For example, the key communication module 314 may receive a lock release request signal from an external device, or may transmit a control signal for lock release to an external device. For example, the key communication module 314 may provide communication with an external device through at least one of Bluetooth™, Bluetooth™ low energy (BLE), low-frequency-ultra-high-frequency (LF-UHF), or a wireless LAN. For example, the wireless communication module 312 and the key communication module 314 may be included in the communication interface 260 in FIG. 2.

According to an embodiment, the power module 316 may manage the power of the electronic device. For example, the power module 316 may check the remaining power of a battery of the electronic device to thus provide the same to the AP 300. When the operation mode of the electronic device is converted to a low-power mode, the power module 316 may provide power to at least one internal module related to a smart key service. That is, when the operation mode of the electronic device is converted to a low-power mode, the power module 316 may cut off the power supplied to at least one remaining internal module that is not related to a smart key service. For example, the power module 316 may include a PMIC (e.g., the power management module 270 in FIG. 2) and a battery 280 of the electronic device.

According to an embodiment, the security module 318 may store information (e.g., authorization information) that requires a security setting, among information related to the operation of the electronic device. The information requiring a security setting may include at least one piece of key data for controlling an external device, identification information of an electronic device, or user authorization information. For example, the security module 318 may include an embedded secure element (eSE) or an embedded subscriber identification module (eSIM). For example, the security module 318 may be configured as at least a portion of the memory 320.

According to an embodiment, the memory 320 may store information necessary for the operation of the electronic device and information generated by the operation of the electronic device. For example, the memory 320 may include at least one of a volatile memory (e.g., a dynamic random access memory (DRAM), a static RAM (SRAM), or a synchronous DRAM (SDRAM)), a non-volatile memory {e.g., a one-time programmable read only memory (OTPROM), a programmable ROM (PROM), an erasable PROM (EPROM), an electrically erasable PROM (EEPROM), a mask ROM, a flash ROM, a flash memory, a hard drive, or a solid-state drive (SSD)}, or an external memory (e.g., a flash drive).

According to an embodiment, the audio processing module 322 may convert sounds to electrical signals, and vice versa. For example, the audio processing module 322 may process sound information input or output through a speaker, a receiver, earphones, a microphone, or the like.

According to an embodiment, the camera module 324 may photograph still images and moving images. For example, the camera module 324 may include one or more image sensors (e.g., a front or rear sensor), lenses, an ISP, or a flash (e.g., an LED or xenon lamp).

According to an embodiment, the display 326 may display various contents corresponding to the driving of the electronic device. The display 326 may receive a touch input, a gesture input, a proximity input, a hovering input, or a pressure input.

According to an embodiment, the connection module 328 may include at least one of wireless fidelity (Wi-Fi), light fidelity (Li-Fi), Zigbee, near field communication (NFC), magnetic secure transmission, RF, a body area network (BAN), or a global navigation satellite system (GNSS).

According to an embodiment, the sensor 330 may measure physical quantities, or may detect the operation state of the electronic device to thereby convert the measured or detected information to electrical signals. For example, the sensor 330 may further include a control circuit for controlling at least one sensor.

According to an embodiment, the SIM 332, for example, may include inherent identification information {e.g., an integrated circuit card identifier (ICCID)} or subscriber information {e.g., an international mobile subscriber identification (IMSI)}.

According to an embodiment, the processor 301 of the AP 300, based on the remaining power of the battery of the electronic device, may determine the operation mode of the electronic device. For example, the processor 301 may check the remaining power of the battery of the electronic device from the power module 316. If the remaining power of the battery of the electronic device is less than a reference power of the battery, the processor 301 may convert the operation mode of the electronic device to a low-power mode.

According to an embodiment, when the operation mode of the electronic device is converted to a low-power mode, the processor 301 of the AP 300 may control power supplied to internal modules of the electronic device. For example, the processor 301 may control the power module 316 so as to maintain the power supplied to the key communication module 314, the power module 316, the security module 318, and the memory 320, which are related to a smart key service 340. The processor 301 may control the power module 316 so as to cut off the power supplied to the wireless communication module 312, the audio processing module 322, the camera module 324, the display 326, the connection module 328, the sensor 330, and the SIM 332, which are not related to a smart key service 350. For example, the processor 301 may control the power module 316 so as to maintain the power supplied to the processor 301 and the internal memory 302 in the AP 300, which are related to the smart key service 340. The processor 301 may control the power module 316 so as to cut off the power supplied to the audio system 303, the peripheral system 304, the GPU 305, the wireless LAN system 306, the multimedia system 307, the sensor system 308, and the modem system 309, which are not related to the smart key service 350. For example, when the electronic device operates in a low-power mode, the processor 301 may convert the operating system of the electronic device to a low-power sub-operating system.

Referring to FIG. 3B, the PMIC 360 of the power module 316 may include a plurality of low-drop output (LDO) ports 362 and a power (VDO) port 364. For example, the PMIC 360 may supply power to internal modules (e.g., internal circuits) of an electronic device through the respective LDO ports 362. For example, when the electronic device operates in a low-power mode, the PMIC 360 may maintain the activation state of an LDO (e.g., LDON 366) corresponding to at least one internal module related to a smart key service, among the internal modules of the electronic device. The PMIC 360 may convert the LDOs 362 corresponding to one or more remaining internal modules, which are not related to a smart key service, to the inactive state. For example, the LDOs 362 may each include a regulator that lowers a voltage supplied to the internal circuit to correspond to the rated capacity of the internal circuit.

Figure 4A:
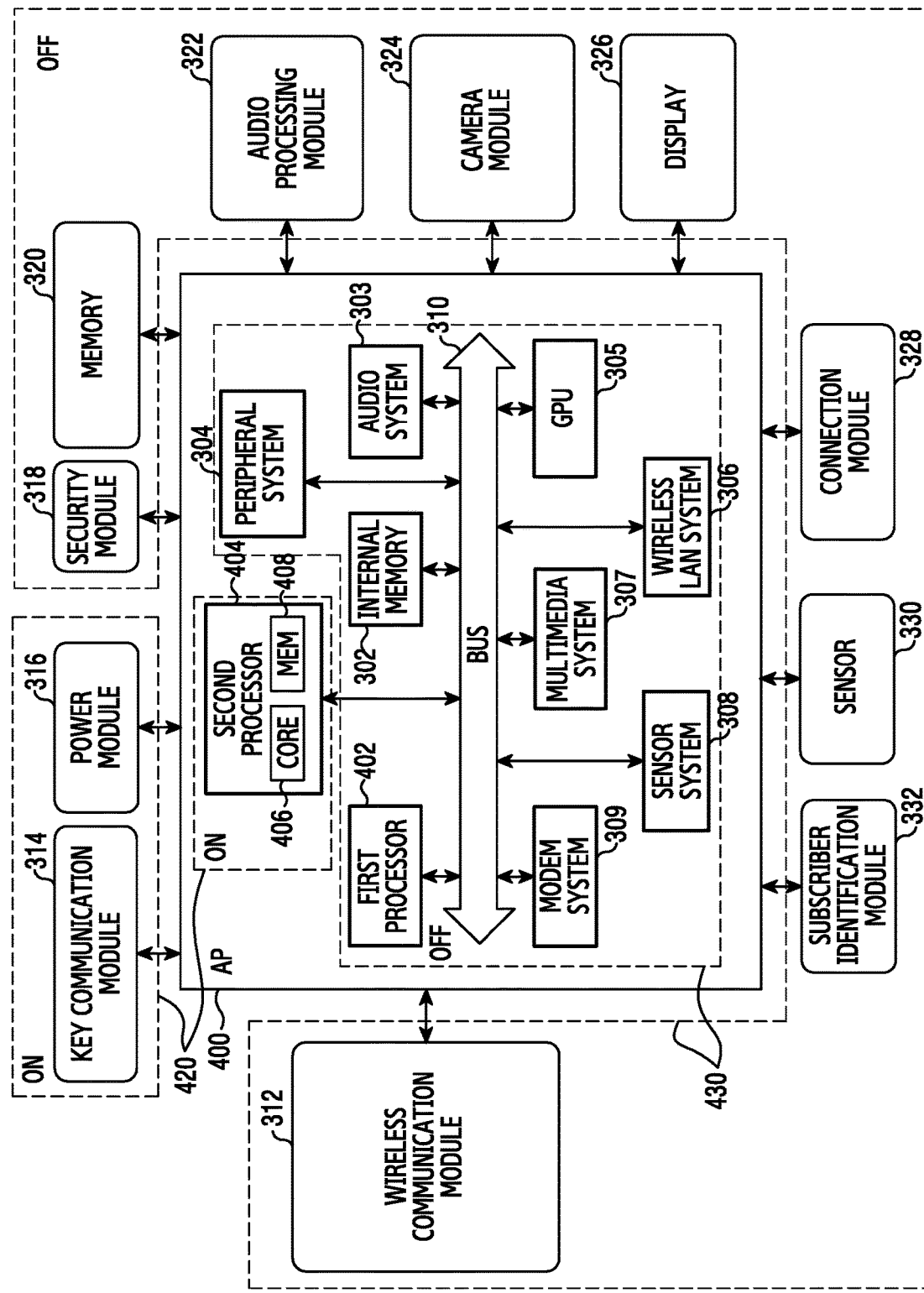
FIGS. 4A and 4B are block diagrams of an electronic device for controlling power supplied to internal modules through a low-power processor in the electronic device according to an embodiment.
Figure 4B:
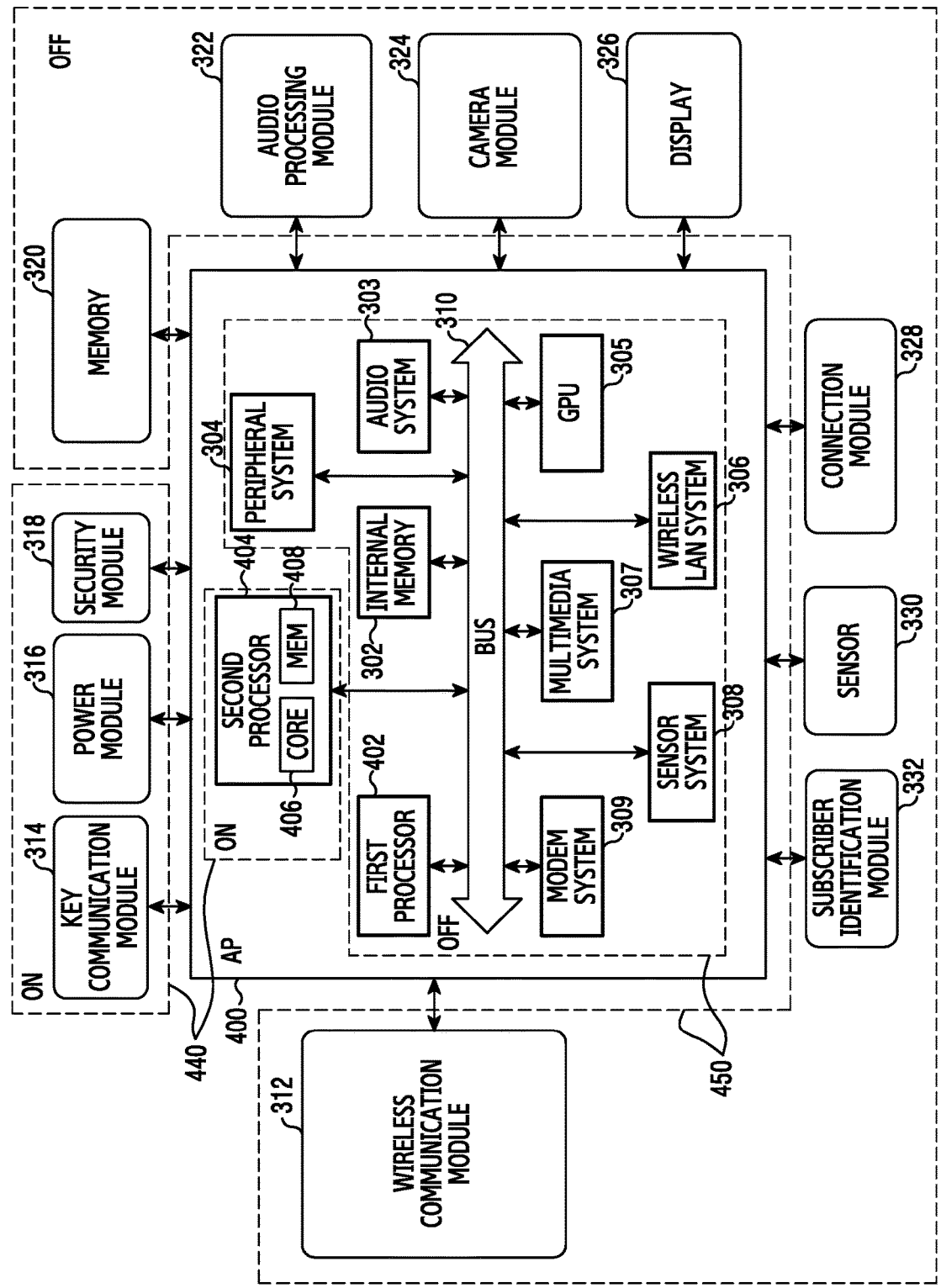

FIGS. 4A and 4B are block diagrams of an electronic device for controlling power supplied to internal modules through a low-power processor in the electronic device according to an embodiment of the present disclosure. The electronic device in the following description may include all or at least some of the elements of the electronic device 201 in FIG. 2.

Referring to FIG. 4A, the electronic device may include an AP 400, a wireless communication module 312, a key communication module 314, a power module 316, a security module 318, a memory 320, an audio processing module 322, a camera module 324, a display 326, a connection module 328, a sensor 330, and a SIM 332. In the following description, the internal modules of the electronic device in FIG. 4A operate in the same manner as the internal modules of the electronic device in FIG. 3A, and thus a detailed description thereof is omitted here.

According to an embodiment, the AP 400 may include a first processor 402 and a second processor 404. For example, the second processor 404 may include a processor having power consumption less than that of the first processor 402. For example, the second processor 404 may include a sensor hub.

According to an embodiment, the first processor 402 of the AP 400, based on the remaining power or level of a battery of the electronic device, may determine the operation mode of the electronic device. For example, the first processor 402 may check the remaining power or level of the battery of the electronic device from the power module 316. When the remaining power or level of the battery of the electronic device is less than a reference power or level of the battery, the first processor 402 may convert the operation mode of the electronic device to a low-power mode.

According to an embodiment, when the operation mode of the electronic device is converted to the low-power mode, the first processor 402 may transmit data for driving the second processor 404, which is stored in the security module 318 and the memory 320, to the second processor 404 (e.g., the internal memory 408 of the second processor 404). The first processor 402 may transmit an activation signal to the second processor 404 before the driving termination procedure of the first processor 402 is completed. When an activation signal is received, the second processor 404 may be activated based on data for driving the second processor 404. For example, the second processor 404 (e.g., a core 406 of the second processor 404) may be driven based on a sub-operating system that operates on low power. For example, the data for driving the second processor 404 may include at least one piece of data (e.g., a driver) for driving the key communication module 314, key data (e.g., a media access control (MAC) pair list), or a smart key application.

According to an embodiment, when the key data is copied into the internal memory 408 of the second processor 404, the second processor 404 may control power supplied to the internal modules of the electronic device. For example, the second processor 404 may control the power module 316 so as to maintain the power supplied to the second processor 404, the key communication module 314, and the power module 316, which are related to a smart key service 420. The second processor 404 may control the power module 316 so as to cut off the power supplied to the remaining elements 402, 302 to 309 of the AP 400, the wireless communication module 312, the security module 318, the memory 320, the audio processing module 322, the camera module 324, the display 326, the connection module 328, the sensor 330, and the SIM 332, which are not related to a smart key service 430.

Referring to FIG. 4B, when driving data for a smart key service, except for the key data, is copied into the internal memory 408 of the second processor 404, the second processor 404 may control power supplied to the internal modules of the electronic device. For example, the second processor 404 may control the power module 316 so as to maintain the power supplied to the second processor 404, the key communication module 314, the power module 316, and the security module 318, which are related to a smart key service 440. The second processor 404 may control the power module 316 so as to cut off the power supplied to the remaining elements 402, 302 to 309 of the AP 400, the wireless communication module 312, the memory 320, the audio processing module 322, the camera module 324, the display 326, the connection module 328, the sensor 330, and the SIM 332, which are not related to a smart key service 450.

Figure 5:
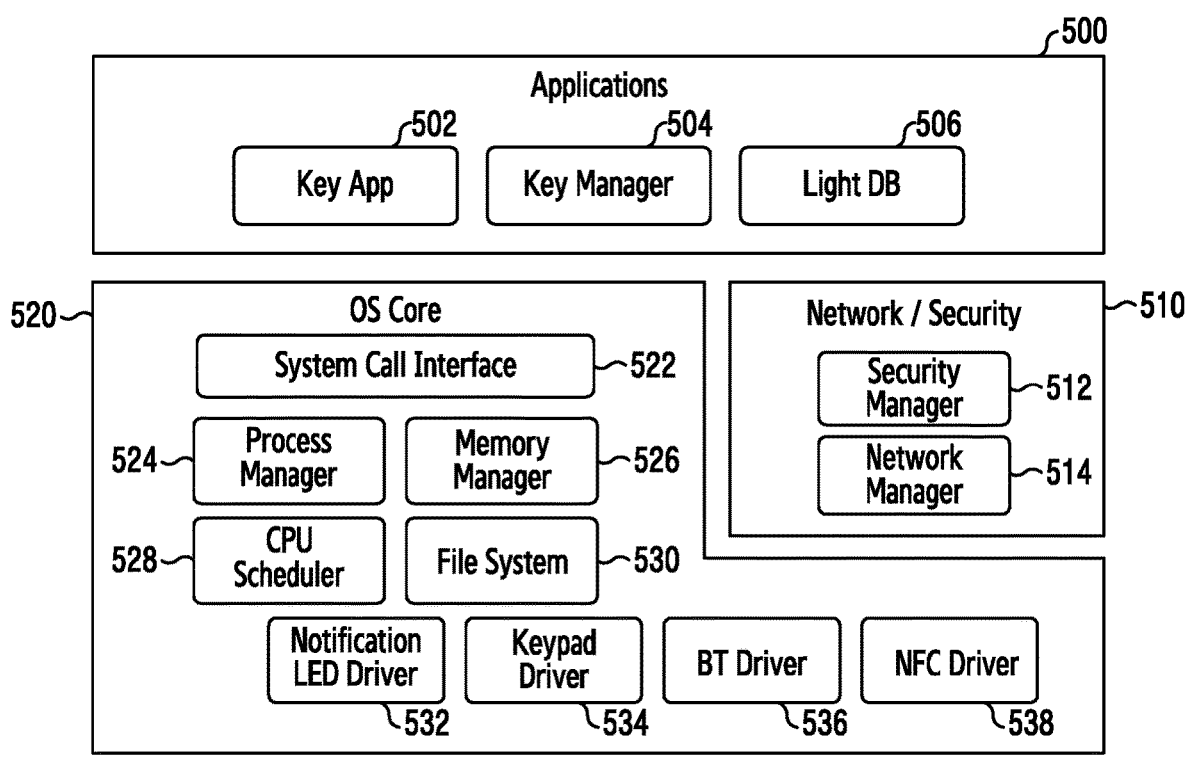
FIG. 5 is a block diagram of a sub-operating system according to an embodiment.

FIG. 5 is a block diagram of a sub-operating system according to an embodiment of the present disclosure. A low-power sub-operating system may include an operating system for supporting a smart key service related to an electronic device 201 and/or various applications executed under the operating system.

Referring to FIG. 5, the program module may include applications 500, network/security 510, and an operating system (OS) core 520. At least some of the program module may be pre-installed in the electronic device, or may be downloaded from the electronic device 202 or 204 or the server 206 in FIG. 2.

The network/security 510 may include a security manager 512 and a network manager 514. The security manager 512 may manage the key data for a smart key service, which is stored in a security module 318. The network manager 514 may control communication connection (e.g., Bluetooth™ or BLE) used for a smart key service.

The OS core 520 may include a system call interface 522, a process manager 524, a memory manager 526, a CPU scheduler 528, a file system 530, a notification LED driver 532, a keypad driver 534, a BT driver 536, and an NFC driver 538.

The applications 500 may include a key application (key app) 502 for a smart key service, a key manager 504 for connecting the key data stored in the security module with the key application, and a database (light DB) 506. For example, when an input corresponding to a smart key service is received from the keypad driver 534, the key application 502 may obtain key data through the security manager 512. The key application 502 may transmit the key data through a wireless connection (e.g., Bluetooth™ or BLE) with an external device using the network manager 514. For example, when a lock release request signal is received from the network manager 514, the key application 502 may obtain key data through the security manager 512. The key application 502 may transmit the key data through a wireless connection (e.g., Bluetooth™ or BLE) with an external device using the network manager 514. For example, the applications 500 may include applications received from an external electronic device.

According to an embodiment, an electronic device may include a first memory configured to store authorization information; a first processor configured to access the first memory; a second memory; and a second processor configured to access the second memory, wherein the first processor may be configured to check state information related to a battery state of the electronic device while the electronic device is in a first state; if the state information satisfies a first condition, provide authorization information to an external device in the first state so that the external device performs authorization using the authorization information; and if the state information satisfies a second condition, copy the authorization information into the second memory in the first state and convert the electronic device to a second state in which power consumption thereof is less than that in the first state, and wherein the second processor may be configured to provide the authorization information to the external device in the second state so that the external device performs authorization using the authorization information.

According to an embodiment, the first processor may be configured to if the state information satisfies a second specified condition, store at least one application related to the authorization in the second memory; and execute the at least one application using the second processor.

According to an embodiment, the electronic device may further include a communication interface configured to transmit authorization information to the external device, and the second memory may further include driving data on the communication interface.

According to an embodiment, the first processor may be configured to determine that the second specified condition is satisfied when the remaining power of a battery of the electronic device is less than a predefined reference value.

According to an embodiment, the first processor may be configured to be operated based on a first operating system, and the second processor may be configured to be operated based on a second operating system having power consumption less than that of the first operating system.

According to an embodiment, the second processor may be configured to maintain power supplied to at least one internal module related to authorization of the external device, among a plurality of internal modules included in the electronic device; and cut off power supplied to one or more remaining internal modules.

According to an embodiment, the at least one internal module related to the authorization of the external device may include at least one of an input module, a communication interface for transmitting authorization information to the external device, or a power management module.

According to an embodiment, the second processor may be configured to check whether or not a user input is detected; generate authorization information corresponding to the external device based on the detection of the user input; and transmit authorization information corresponding to the external device to the external device.

According to an embodiment, the second processor may be configured to generate authorization information corresponding to the external device in response to reception of a authorization request signal; and transmit authorization information corresponding to the external device to the external device.

According to an embodiment, an electronic device may include a memory configured to store authorization information; and a processor configured to access the memory, wherein the processor may be configured to check state information related to a battery state of the electronic device while the electronic device is operating based on a first operating system; if the state information satisfies a first condition, provide authorization information to an external device while the electronic device is operating based on the first operating system so that the external device performs authorization using the authorization information; and if the state information satisfies a second condition, convert the electronic device from the first operating system to a second operating system having power consumption less than that of the first operating system and provide the authorization information to the external device so that the external device performs authorization using the authorization information.

According to an embodiment, the processor may be configured to maintain power supplied to at least one internal module related to authorization of the external device, among a plurality of internal modules included in the electronic device, based on the second operating system; and cut off power supplied to one or more remaining internal modules.

According to an embodiment, the at least one internal module related to the authorization of the external device may include at least one of an input module, a communication interface for transmitting authorization information to the external device, or a power management module.

According to an embodiment, an electronic device may include a first memory; a first processor; a second processor configured to have power consumption less than that of the first processor; and a second memory configured to be accessed by the second processor, wherein the first processor may be configured to check state information of a battery of the electronic device; based on the state information of the battery, determine whether or not to transmit driving information of the second processor; and based on the determination of transmission of the driving information of the second processor, store the driving information of the second processor, which is stored in the first memory, in the second memory, and wherein the second processor may be configured to, based on the driving information of the second processor, which is stored in the second memory, transmit authorization information to an external device; and wherein the first processor may be configured to be terminated at the time the second processor is driven.

According to an embodiment, the electronic device may further include a communication interface configured to transmit authorization information to the external device, wherein the second memory may be configured to store driving information of the second processor, which includes at least one piece of driving data on the communication interface, authorization information on the external device, or at least one application related to the authorization.

According to an embodiment, the communication interface may be configured to transmit the authorization information to the external device through one of Bluetooth™, BLE, wireless LAN, or LF-UHF communication.

According to an embodiment, the first processor may be configured to operate based on a first operating system and the second processor may be configured to operate based on a second operating system different from the first operating system.

According to an embodiment, the second processor may be configured to convert the OS of the electronic device to the second operating system by rebooting the electronic device at the time at which the operation of the first processor is terminated.

According to an embodiment, the second processor may be configured to maintain power supplied to at least one internal module related to authorization of the external device, among a plurality of internal modules included in the electronic device, and may be configured to cut off power supplied to one or more remaining internal modules.

According to an embodiment, the at least one internal module related to the authorization of the external device may include at least one of an input module, a communication interface for transmitting the authorization information to the external device, or a power management module.

According to an embodiment, the first memory may further include a secure area configured to store authorization information, and the second processor may be configured to if authorization information of the external device is stored in the second memory, cut off power supplied to the first memory including the secure area; and if no authorization information of the external device exists in the second memory, maintain power supplied to the secure area in the first memory.

Figure 6:
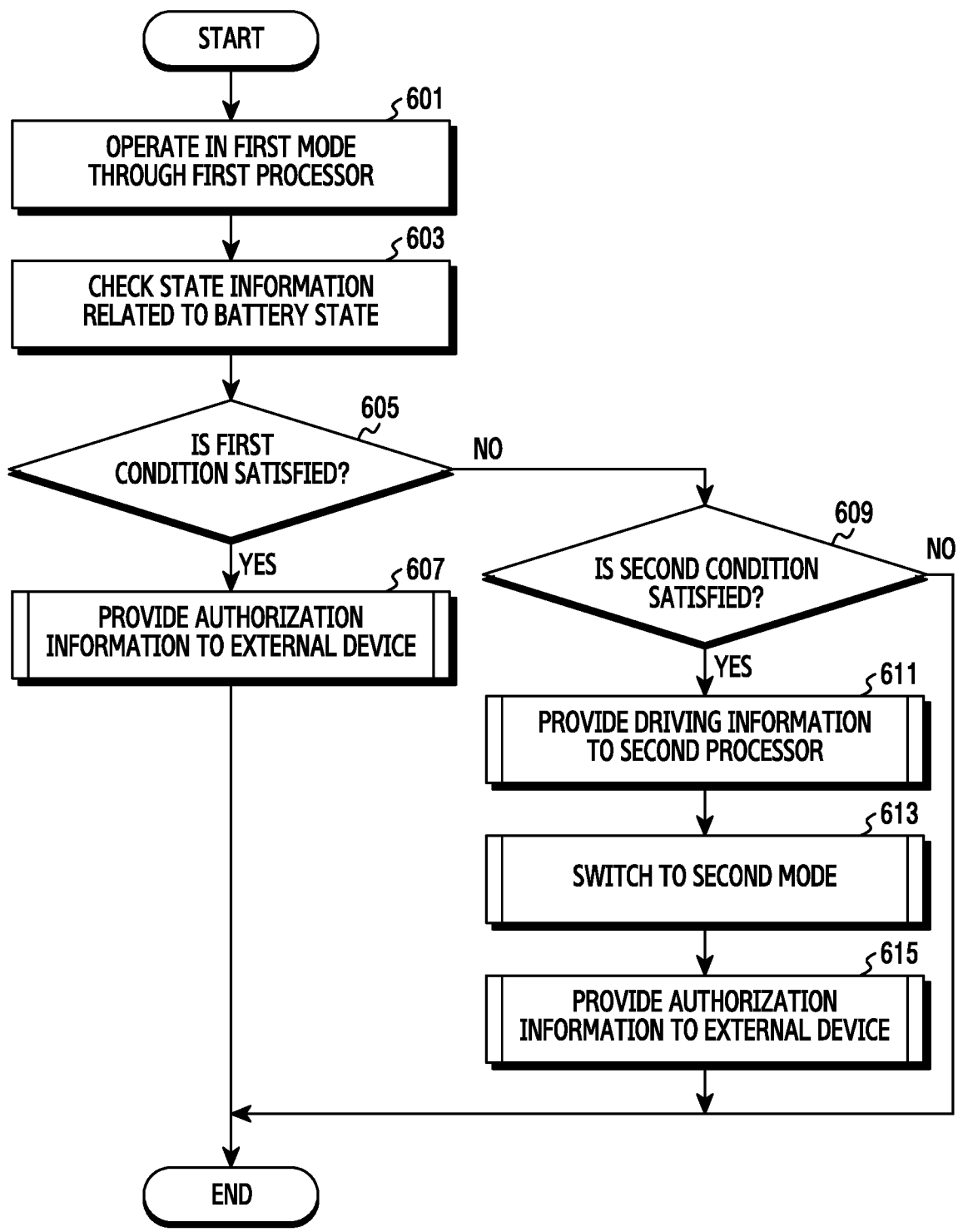
FIG. 6 is a flowchart of a method for converting a processor in an electronic device according to an embodiment.

FIG. 6 is a flowchart of a method for converting a processor in an electronic device according to an embodiment.

Referring to FIG. 6, an electronic device (e.g., the first processor 402 in FIG. 4A) may operate by means of a first processor in a first mode (e.g., a first state) in operation 601. For example, the electronic device 201 may include the first processor 402 and the second processor 404 as shown in FIG. 4A. When the electronic device 201 is in the first state (e.g., a normal mode), the first processor 402 may control internal modules of the electronic device so as to provide various services including a smart key service. For example, the first processor 402 may be driven based on a first OS.

The electronic device (e.g., the first processor 402 in FIG. 4A) may check state information related to the battery state of the electronic device in operation 603. For example, the first processor 402 may periodically receive information on the remaining power or level of a battery of the electronic device from the power module 316 (e.g., a PMIC). For example, the power module 316 may periodically check the remaining power or level of a battery without control of a separate module (e.g., the first processor 402 in FIG. 4A).

The electronic device may determine whether or not the state information related to the battery state satisfies a first condition in operation 605. For example, the first processor 402 may compare the remaining power of the battery received from the power module 316 with a reference power of the battery. If the remaining power of the battery is greater than or equal to the reference power of the battery, the first processor 402 may determine that the first condition is satisfied.

When the state information related to the battery state satisfies the first condition, the electronic device may transmit, to the external device, authorization information stored in the electronic device through the first processor so that the external device can perform authorization in operation 607. For example, when an event for authorization of the external device occurs, the first processor 402 may control the key communication module 314 so as to transmit authorization information stored in the security module 318 to the external device. For example, the event for authorization of the external device may be generated based on at least one of an icon selection input, an audio input, or a hardware button input, which corresponds to lock release.

If the state information related to the battery state does not satisfy the first condition, the electronic device may determine whether or not the state information related to the battery state satisfies a second condition in operation 609. For example, when the remaining power of the battery received from the power module 316 is less than the reference power of the battery, the first processor 402 may determine that the second condition is satisfied. For example, when the remaining power of the battery is less than the reference power of the battery, the power module 316 may transmit, to the first processor 402, an event occurrence signal for conversion to a low-power mode. When the event occurrence signal is received from the power module 316, the first processor 402 may determine that the second condition is satisfied.

If the state information related to the battery state does not satisfy any one of the first condition and the second condition, the electronic device may determine that the conversion of the processor is limited.

When the state information related to the battery state satisfies the second condition, the electronic device may transmit driving information of the second processor to the second processor in operation 611. For example, when the state information related to the battery state satisfies the second condition, the first processor 402 may copy driving information of the second processor 404, which is stored in at least one of the security module 318 or the memory 320, into the internal memory 408 of the second processor 404 for conversion to a low-power mode. For example, the driving information of the second processor 404 may include at least one piece of data for driving a communication module related to a smart key service, key data (e.g., authorization information), or a smart key application.

The electronic device may convert the operation mode of the electronic device to a second mode in operation 613. For example, when the first processor 402 transmits the driving information of the second processor 404 to the second processor 404, the first processor 402 may perform a driving termination procedure for the first operating system. The first processor 402 may transmit an activation signal to the second processor 404 before the driving termination procedure is completed. The second processor 404 may operate based on the driving information of the second processor 404 in a low-power mode upon receiving the activation signal. For example, the second processor 404 may be operated under the second operating system at low-power. For example, the first processor 402 may control at least one of the display 326 or the audio processing module 322 so as to output a user interface or a notification sound indicating the conversion to a low-power mode before the driving termination procedure is completed.

When the operation mode of the electronic device is converted to the second mode, the electronic device (e.g., the second processor 404 in FIG. 4A) may transmit authorization information, which is stored in the electronic device, to the external device through the second processor, in operation 615, so that the external device performs authorization. For example, when an event for authorization of the external device occurs, the second processor 404 may control the key communication module 314 so as to transmit authorization information stored in the security module 318 or the internal memory 408 to the external device.

Figure 7:
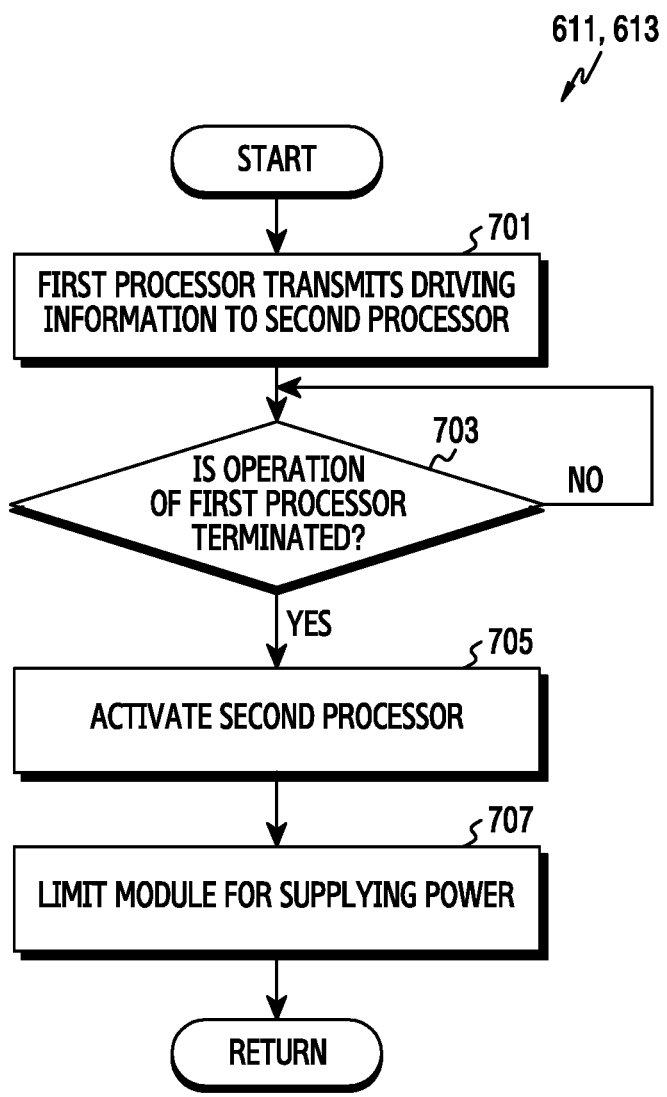
FIG. 7 is a flowchart of a method for activating a low-power processor in an electronic device according to an embodiment.

FIG. 7 is a flowchart of a method for activating a low-power processor in an electronic device according to an embodiment. Hereinafter, the operation for driving the second processor in operations 611 to 613 of FIG. 6 is described.

Referring to FIG. 7, if the state information related to the battery state satisfies the second condition (e.g., in operation 609 in FIG. 6), the electronic device (e.g., the first processor 402 in FIG. 4A) may transmit driving information of the second processor to the second processor using the first processor in operation 701. For example, when the second processor 404 is used for another operation (e.g., a sensor hub) in the first mode (e.g., the first state), the first processor 402 may initialize the second processor 404. The first processor 402 may copy driving information of the second processor 404, which is stored in at least one of the security module 318 or the memory 320, into the internal memory 408 of the initialized second processor 404.

The electronic device may check whether or not the operation of the first processor is terminated in operation 703. For example, when the first processor 402 transmits the driving information to the second processor 404, the first processor 402 may perform a driving termination procedure of the first operating system, which is operating in the first processor 402. The first processor 402 may transmit an activation signal to the second processor 404 before the driving termination procedure of the first operating system is completed.

When the operation of the first processor is terminated, the electronic device (e.g., the second processor 404 in FIG. 4A) may activate the second processor in operation 705. For example, when an activation signal is received from the first processor 402, the second processor 404 may load the second low-power operating system through rebooting.

The electronic device, based on the second mode (e.g., a low-power mode), may limit power supplied to at least one of a plurality of internal modules included in the electronic device in operation 707. For example, the second processor 404, as shown in FIG. 4A, may control the power module 316 so as to maintain the power supplied to the second processor 404, the key communication module 314, and the power module 316, which are related to a smart key service, and so as to cut off the power supplied to the remaining modules. For example, the second processor 404, as shown in FIG. 4B, may control the power module 316 so as to maintain the power supplied to the second processor 404, the key communication module 314, the power module 316, and the security module 318, which are related to a smart key service, and so as to cut off the power supplied to the remaining modules. For example, the second processor 404 may provide a smart key service using at least one internal module related to the smart key service. For example, the second processor 404 may load only at least one internal module related to the smart key service through the second operating system. Accordingly, the driving of at least one remaining internal module, which is not related to the smart key service, may be restricted in the electronic device.

Figure 8:
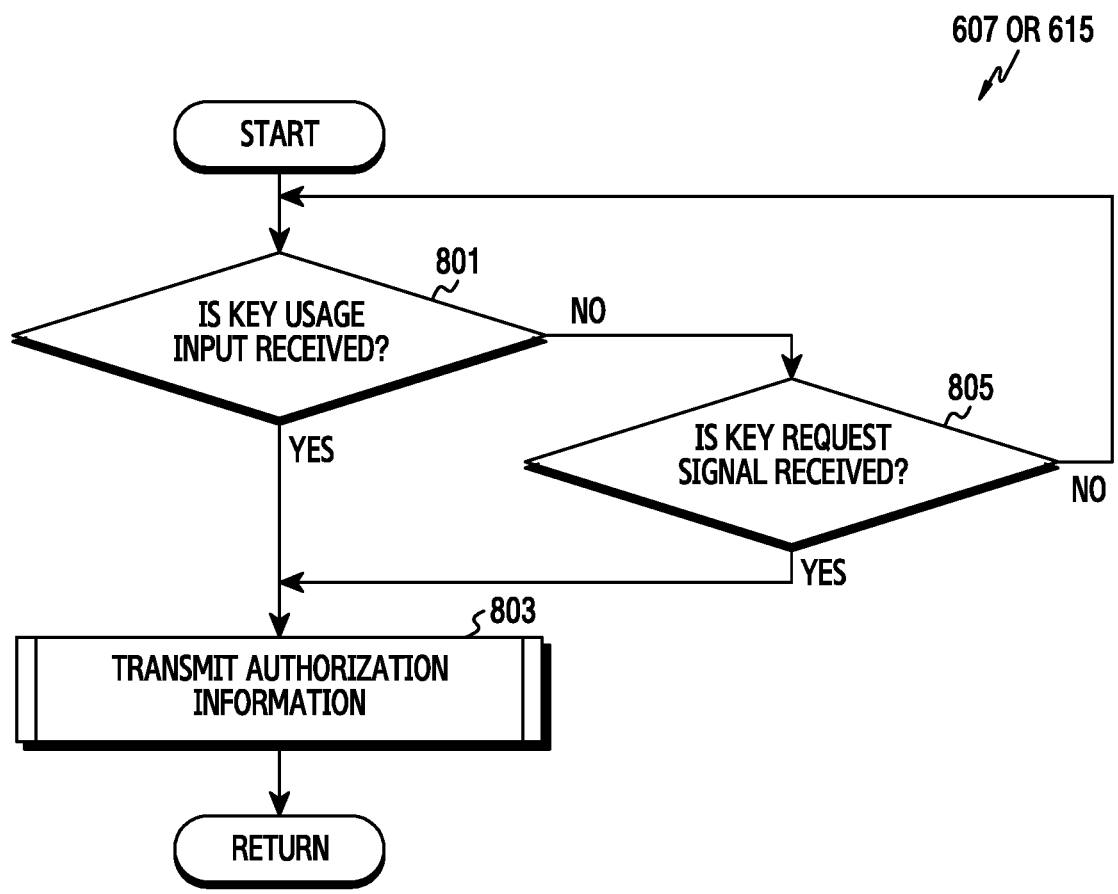
FIG. 8 is a flowchart of a method for releasing a lock of an external device in an electronic device in a low-power mode according to an embodiment.

FIG. 8 is a flowchart of a method for releasing the lock of an external device in an electronic device in a low-power mode according to an embodiment. Hereinafter, the operation for providing authorization information to an external device in operation 607 or operation 615 of FIG. 6 is described.

Referring to FIG. 8, the electronic device (e.g., the first processor 402 or the second processor 404 in FIG. 4A) may check whether or not an input for using a smart key is received in operation 801. For example, the first processor 402 may determine whether or not the electronic device 201 detects an input by a button corresponding to lock release in a first mode. For example, in a case where the electronic device 201 operates in a second mode (e.g., a low-power mode), the second processor 404 may perform control so as to maintain the active state of a button corresponding to lock release. The second processor 404 may confirm whether or not an input by the activated button corresponding to lock release is detected.

When an input for using a smart key is received, the electronic device may transmit a control signal for controlling the external device corresponding to the input in operation 803. For example, when an input for using a smart key is received, the second processor 404 or the first processor 402 may obtain key data corresponding to the external device from the security module 318 (or the internal memory 408). The second processor 404 or the first processor 402 may control the key communication module 314 so as to, based on the key data corresponding to the external device, generate a control signal for lock release and so as to transmit the same to the external device. For example, when an input for using a smart key is received, the second processor 404 or the first processor 402 may control an indicator so as to output recognition information of a button input. For example, the key data may include authorization information for lock release in the external device.

When an input for using a smart key is not received, the electronic device may check whether or not a key request signal is received from the external device in operation 805. For example, the second processor 404 or the first processor 402 may determine whether or not a lock release request signal is received through the key communication module 314. For example, the key communication module 314 may remain in the active state in the second mode (e.g., a low-power mode).

When a key request signal is received from the external device, the electronic device may transmit, to the external device, a control signal for controlling the external device, which corresponds to the key request signal, in operation 803. For example, the second processor 404 or the first processor 402 may control an indicator so as to output the reception state of the key request signal. For example, the control signal corresponding to the key request signal may include authorization information for verifying the electronic device in the external device.

Figure 9:
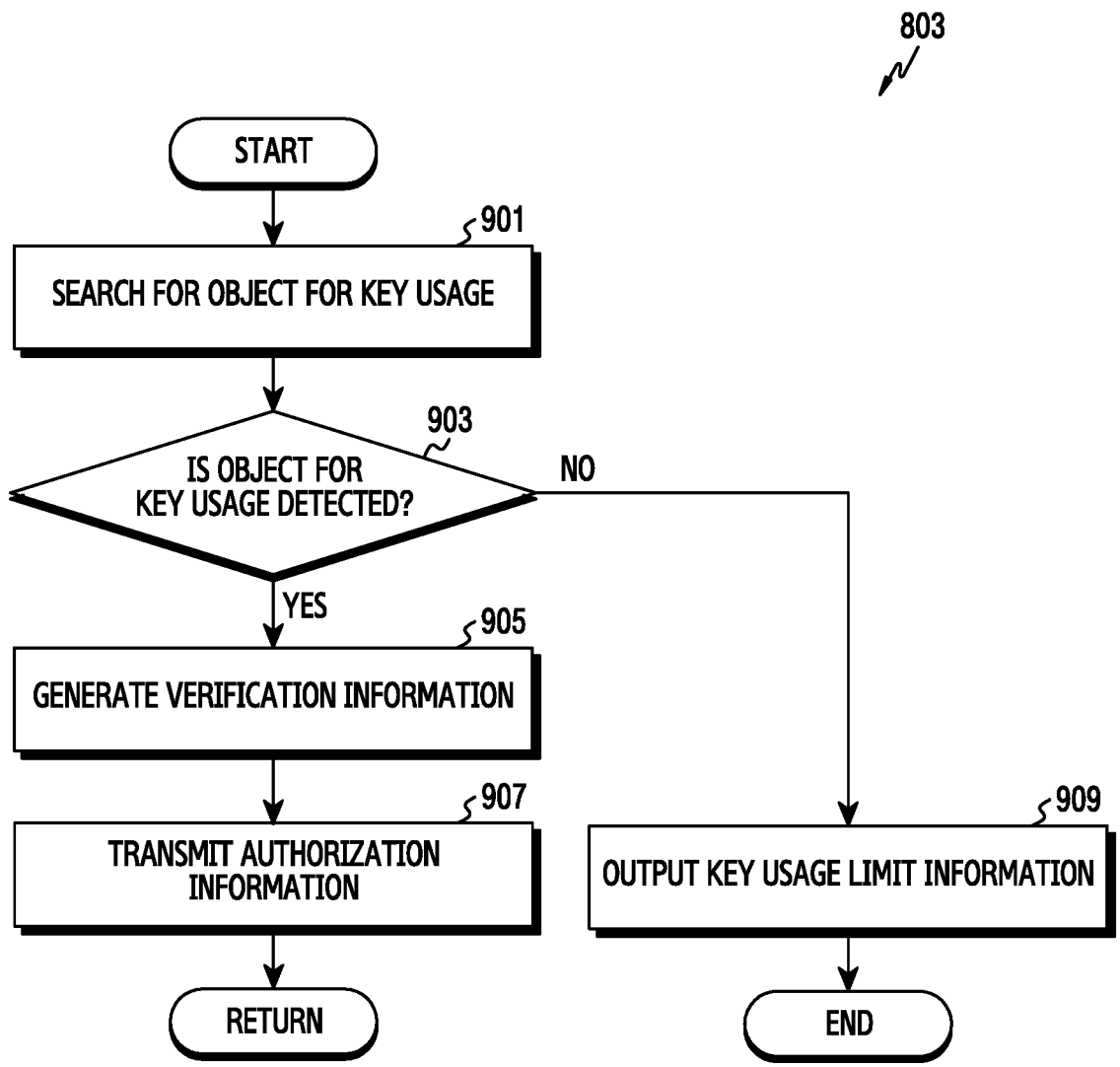
FIG. 9 is a flowchart of a method for searching for an object for key usage and transmitting authorization information in an electronic device in a low-power mode according to an embodiment.

FIG. 9 is a flowchart of a method for searching for an object for key usage and transmitting authorization information in an electronic device in a low-power mode according to an embodiment. Hereinafter, the operation for transmitting a control signal in operation 803 in FIG. 8 is described.

Referring to FIG. 9, when an input for using a smart key is received (e.g., in operation 801 in FIG. 8), the electronic device (e.g., the first processor 402 or the second processor 404 in FIG. 4A) may search for an object to be provided with a smart key service in operation 901. For example, the second processor 404 or the first processor 402 may control the key communication module 314 so as to transmit a scan request signal in order to check whether or not there is an external device that is adjacent to the electronic device 201 and is to use the smart key.

The electronic device may determine whether or not an object for smart key usage has been detected in operation 903. For example, when a response signal to the scan request signal is received through the key communication module 314, the second processor 404 or the first processor 402 may determine that an external device corresponding to the response signal is adjacent thereto. The second processor 404 or the first processor 402 may check whether or not there is any external device registered in the electronic device 201, among the adjacent external devices.

When an object for smart key usage is detected, the electronic device may generate a control signal corresponding to the detected object (e.g., a door lock or a vehicle) in operation 905. For example, the second processor 404 or the first processor 402 may obtain key data on the external device from the security module 318 (or the memory 408 of the second processor 404). The second processor 404 or the first processor 402 may generate a control signal for lock release by encrypting a lock release signal using the key data on the external device.

In operation 907, the electronic device may transmit the control signal to the object (e.g., a door lock or a vehicle) detected in operation 903. For example, the second processor 404 or the first processor 402 may control the key communication module 314 so as to transmit a control signal for lock release. For example, the control signal for lock release may include authorization information for lock release of the external device that is a detected object.

If no object for smart key usage is detected, the electronic device may output usage limit information of a smart key in operation 909. For example, if no external device for smart key usage is detected, the second processor 404 or the first processor 402 may determine that the usage of a smart key is unnecessary. The second processor 404 or the first processor 402 may output the smart key usage limit information through an indicator or a notification sound.

In accordance with an embodiment of the present disclosure, when an input for smart key usage is received, the second processor 404 or the first processor 402 may confirm the number of pieces of key data stored in the electronic device 201. For example, in the case where the key data corresponding to one external device is stored in the electronic device 201, the second processor 404 or the first processor 402 may control the key communication module 314 so as to transmit a control signal corresponding to the key data. That is, the second processor 404 or the first processor 402 may omit the operations 901 and 903 in FIG. 9. For example, if the key data corresponding to a plurality of external devices is stored in the electronic device 201, the second processor 404 or the first processor 402 may search for nearby external devices (e.g., operation 901).

Figure 10:
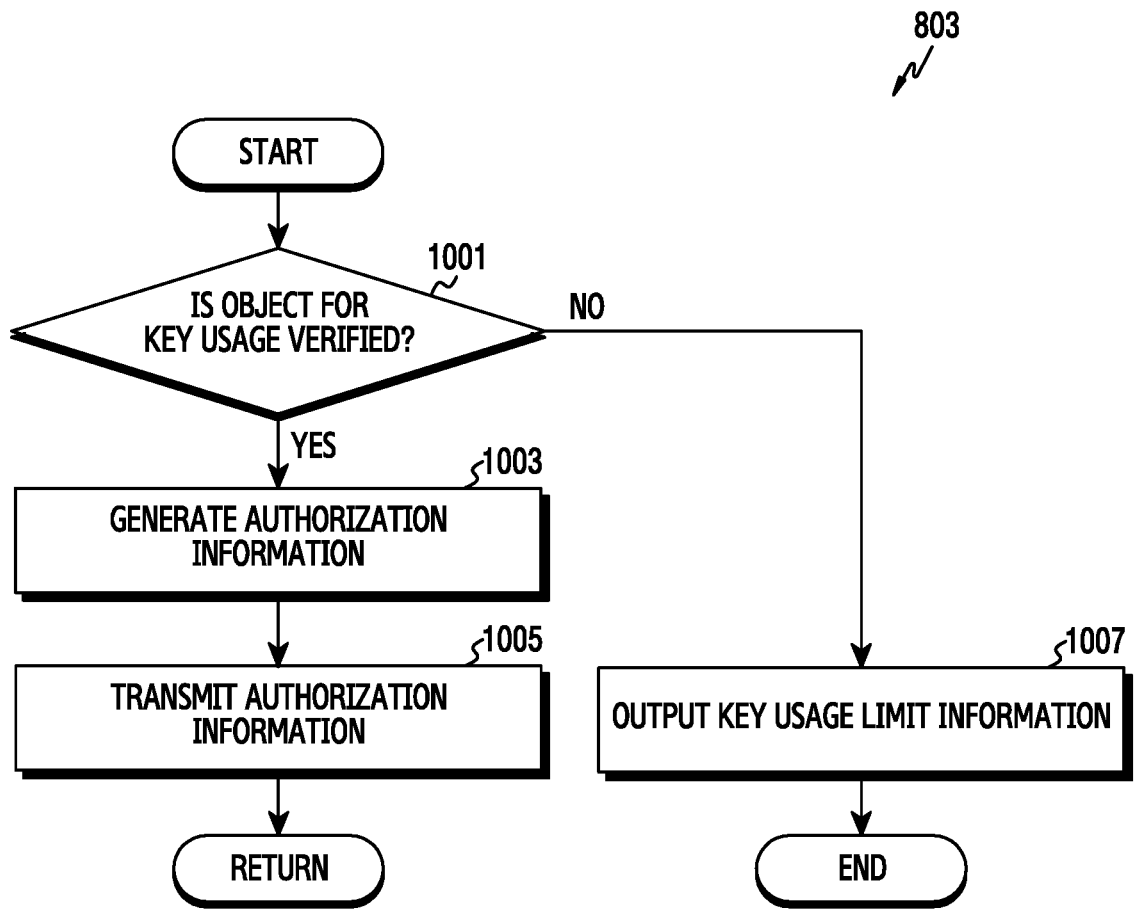
FIG. 10 is a flowchart of a method for transmitting authorization information to an adjacent object for key usage in an electronic device in a low-power mode according to an embodiment.

FIG. 10 is a flowchart of a method for transmitting authorization information to a nearby object for key usage in an electronic device in a low-power mode according to an embodiment. Hereinafter, the operation for transmitting a control signal in operation 803 in FIG. 8 is described.

Referring to FIG. 10, when a key request signal is received from an external device (e.g., in operation 805 in FIG. 8), the electronic device (e.g., the first processor 402 or the second processor 404 in FIG. 4A) may confirm whether or not the object for key usage can be verified in operation 1001. For example, when a key request signal is received, based on identification information of the external device included in the key request signal, the second processor 404 or the first processor 402 may perform a authorization procedure for the external device that has transmitted the key request signal.

When the authorization of the object for key usage (external device) that has transmitted the key request signal is successful, the electronic device may generate a control signal corresponding to the object for key usage in operation 1003. For example, the second processor 404 or the first processor 402 may obtain key data on the external device from the security module 316 (or the memory 408 of the second processor 404). The second processor 404 or the first processor 402 may generate a control signal for lock release by encrypting a lock release signal using the key data on the external device. For example, the control signal for lock release may include authorization information for lock release of the external device.

The electronic device may transmit the control signal to the object for key usage (external device) in operation 1005. For example, the second processor 404 or the first processor 402 may control the key communication module 314 so as to transmit the control signal for lock release.

When the electronic device fails to verify the object for key usage (external device) that has transmitted the key request signal, the electronic device may output smart key usage limit information in operation 1007. For example, if the second processor 404 or the first processor 402 fails to verify the object for key usage (external device) that has transmitted the key request signal, the second processor 404 may determine that the usage of the smart key is limited. The second processor 404 or the first processor 402 may output smart key usage limit information through an indicator or a notification sound.

Figure 11:
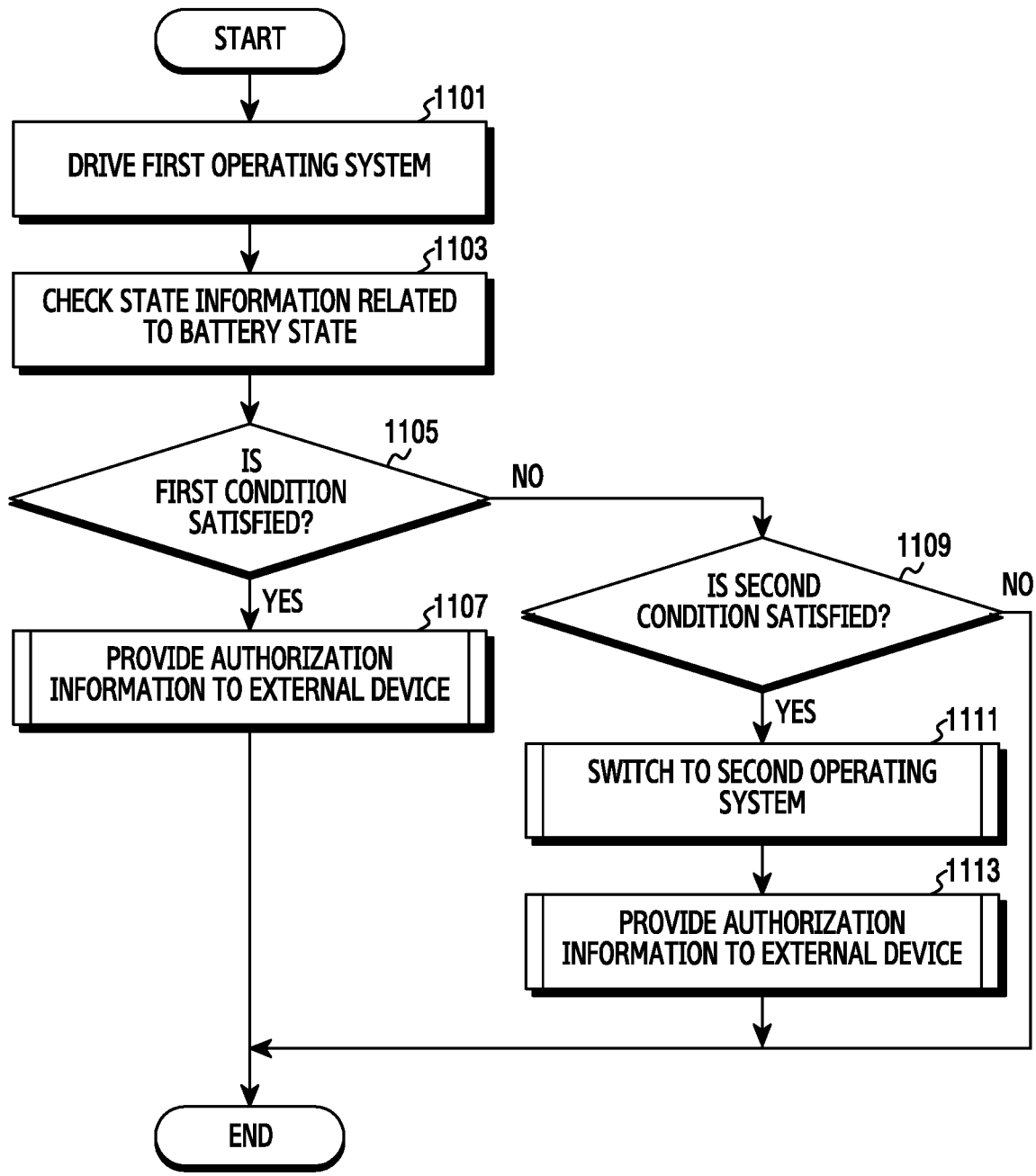
FIG. 11 is a flowchart of a method for converting an operating system in an electronic device according to an embodiment.

FIG. 11 is a flowchart of a method for converting an OS in an electronic device according to an embodiment.

Referring to FIG. 11, an electronic device (e.g., the processor 301 in FIG. 3A) may operate in a normal mode by means of a first OS in operation 1101. For example, the processor 301 may control internal modules of the electronic device 201 so as to provide various services including a smart key service through a first OS, among a plurality of OSs that can be supported by electronic device 201. For example, the first OS may include Android®, iOS®, Windows®, Symbian®, Tizen®, or Bada™.

The electronic device may check state information related to the battery state of the electronic device in operation 1103. For example, the processor 301 may periodically check the remaining power or level of a battery through the power module 316 (e.g., a PMIC). For example, the power module 316 may periodically check the remaining power or level of a battery without control of other modules.

The electronic device may determine whether or not the state information related to the battery state satisfies a first condition in operation 1105. For example, the processor 301 may compare the remaining power of the battery 280 received from the power module 316 with a reference power of the battery. If the remaining power of the battery 280 is greater than or equal to the reference power of the battery, the processor 301 may determine that the first condition is satisfied.

When the first condition is satisfied, the electronic device may transmit, to the external device, authorization information stored in the electronic device using a first OS in operation 1107. For example, the processor 301 may control the key communication module 314 so as to transmit authorization information stored in the security module 318 to the external device as described in operations 801 to 805 in FIG. 8.

If the state information related to the battery state does not satisfy the first condition, the electronic device may determine whether or not the state information related to the battery state satisfies a second condition in operation 1109.

If the state information related to the battery state does not satisfy any one of the first condition and the second condition, the electronic device may determine that the conversion of the operating system is limited.

When the state information related to the battery state satisfies the second condition, the electronic device may convert the operating system of the electronic device to a second OS supporting a low-power mode in operation 1111. For example, the processor 301 may load the second OS, which supports a smart key service at low power, among a plurality of OSs supported by the electronic device 201, by rebooting the electronic device 201. For example, the second OS may include a sub-operating system driven by low power.

The electronic device may transmit authorization information stored in the electronic device to the external device through the second OS supporting a low-power mode in operation 1113. For example, when the second OS is loaded, the processor 301 may maintain the power supplied to at least one internal module (e.g., the key communication module 314 or the security module 318) related to a smart key service, among a plurality of internal modules included in the electronic device 201. The processor 301 may control the key communication module 314 so as to transmit authorization information stored in the security module 318 to the external device using at least one internal module to which power is supplied, as described in operations 801 to 805 in FIG. 8.

Figure 12:
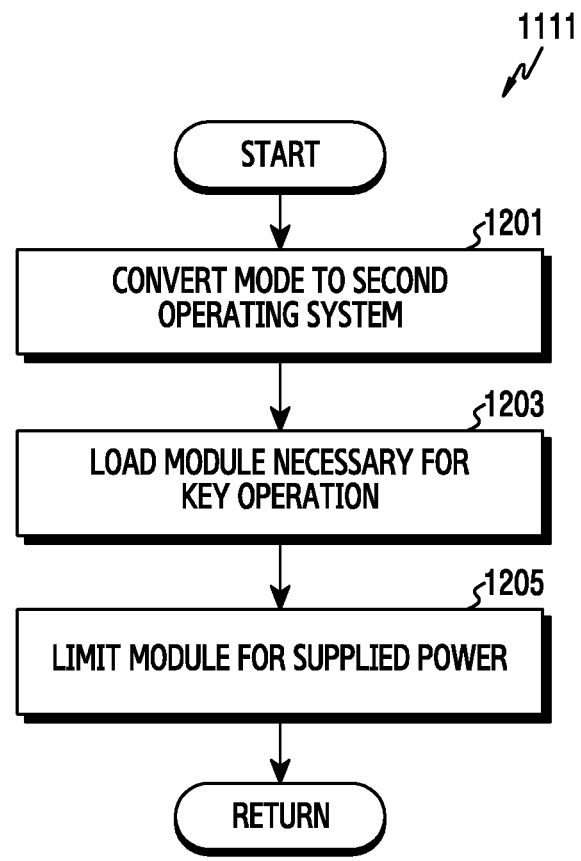
FIG. 12 is a flowchart of a method for controlling power supplied to internal modules through a converted operating system in an electronic device according to an embodiment.

FIG. 12 is a flowchart of a method for controlling power supplied to internal modules through a converted OS in an electronic device according to an embodiment. Hereinafter, the operation for converting the OS to a second OS in operation 1111 of FIG. 11 is described.

Referring to FIG. 12, when the state information related to the battery state satisfies the second condition (e.g., in operation 1109 in FIG. 11), an electronic device (e.g., processor 301 of FIG. 3A) may convert the OS of the electronic device to a second OS in operation 1201. For example, the processor 301 may load the second OS by rebooting the electronic device 201, which is running under the first OS.

The electronic device may load at least some modules related to a smart key service, among the internal modules included in the electronic device, based on the second OS driven in the electronic device in operation 1203. For example, the second OS may be operated at low power to provide a smart key service. The processor 301, when it is operated under the second OS, may activate at least one internal module related to a smart key service, among a plurality of internal modules included in the electronic device 201. Based on loading information on at least some modules related to a smart key service, the electronic device may limit the modules to be supplied with power in operation 1205. For example, the processor 301 may load the key communication module 314, the power module 316, the security module 318, and the memory 320 through the second OS as shown in FIG. 3A. The power module 316, as shown in FIG. 3A, may maintain the power supplied to at least one internal module loaded by the processor 301, among the plurality of internal modules included in the electronic device 201 (340). The power module 316, as shown in FIG. 3A, may cut off the power supplied to the wireless communication module 312, the audio processing module 322, the camera module 324, the display 326, the connection module 328, the sensor 330, and the subscriber identification module 332, which are not loaded by the processor 301 (350).

Figure 13:
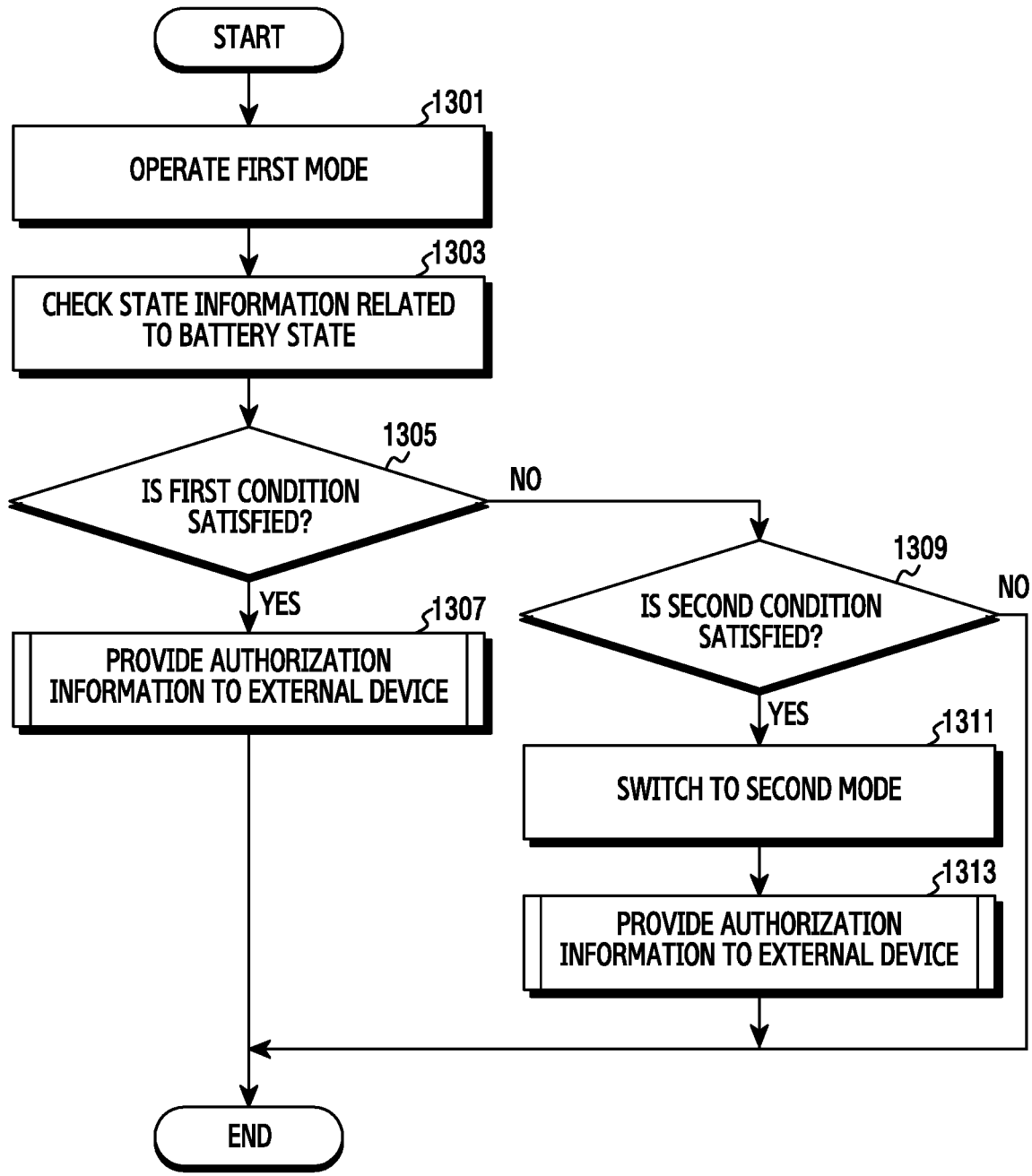
FIG. 13 is a flowchart of a method for controlling power supplied to internal modules in an electronic device according to an embodiment.

FIG. 13 is a flowchart of a method for controlling the power supplied to internal modules in an electronic device according to an embodiment.

Referring to FIG. 13, an electronic device (e.g., processor 301 of FIG. 3A) may operate in a first mode (e.g., normal mode) in operation 1301. For example, the processor 301 may control internal modules of the electronic device 201 so as to provide various services including a smart key service.

The electronic device may check state information related to the battery state of the electronic device in operation 1303. For example, the power module 316 (e.g., a PMIC) may periodically check the remaining power or level of a battery 280. For example, the power module 316, based on the control of the processor 301, may check the remaining power of the battery 280.

The electronic device may determine whether or not the state information related to the battery state satisfies a first condition in operation 1305. For example, if the remaining power of the battery 280, which is confirmed by the power module 316, is greater than or equal to a reference power of the battery, the processor 301 may determine that the state information (e.g., the remaining power of the battery) related to the battery state satisfies a first condition.

When the state information related to the battery state satisfies the first condition, the electronic device may transmit, to the external device, authorization information stored in the electronic device in a first mode in operation 1307. For example, the processor 301 may control the key communication module 314 so as to transmit authorization information stored in the security module 318 to the external device as described in operations 801 to 805 in FIG. 8.

If the state information related to the battery state does not satisfy the first condition, the electronic device may determine whether or not the state information related to the battery state satisfies a second condition in operation 1309.

If the state information related to the battery state does not satisfy the first condition or the second condition, the electronic device may determine that the conversion of the operation mode of the electronic device is limited.

When the state information related to the battery state satisfies the second condition, the electronic device may convert the operation mode of the electronic device to a second mode (e.g., a low-power mode) in operation 1311. For example, when the remaining power of the battery 280 is less than a reference power of the battery, the processor 301 may convert the operation mode of the electronic device 201 to a second mode for a smart key service (e.g., a low-power mode).

The electronic device may transmit authorization information stored in the electronic device to the external device in the second mode (e.g., a low-power mode) in operation 1313. For example, when the operation mode of the electronic device 201 is converted to the second mode, the processor 301 may maintain the power supplied to at least one internal module (e.g., the key communication module 314 or the security module 318) related to a smart key service, among a plurality of internal modules included in the electronic device 201. The processor 301 may control the key communication module 314 so as to transmit authorization information stored in the security module 318 to the external device using at least one internal module to which power is supplied, as described in operations 801 to 805 in FIG. 8.

According to an embodiment, the electronic device can convert the operation mode of the electronic device to a normal mode when connection of an external power source is detected. For example, the external power source may include at least one of a wired charging source using a charging cable or a wireless charging source.

According to an embodiment, an operating method of an electronic device may include checking state information of a battery of the electronic device through a first processor of the electronic device; based on the state information of the battery, determining whether or not to transmit driving information of a second processor; based on the determination of transmission of the driving information of the second processor, storing the driving information of the second processor, which is stored in a first memory of the electronic device, in a second memory that the second processor is able to access; and based on the driving information of the second processor, which is stored in the second memory, transmitting authorization information to an external device through the second processor of the electronic device, wherein the first processor may be configured to be terminated at the time at which the second processor is driven.

According to an embodiment, the driving information of the second processor may include at least one piece of driving data on the communication interface for transmitting authorization information to an external device, authorization information on the external device, or at least one application related to the authorization.

According to an embodiment, the communication interface may use at least one of Bluetooth™, BLE, wireless LAN, or LF-UHF communication.

According to an embodiment, the first processor may operate based on a first OS and the second processor may operate based on a second OS that is different from the first OS.

According to an embodiment, the method may further include converting the OS of the electronic device to the second OS by rebooting the electronic device through the second processor at the time at which the operation of the first processor is terminated.

According to an embodiment, the method may further include, through the second processor, maintaining power supplied to at least one internal module related to authorization of the external device, among a plurality of internal modules included in the electronic device, and cutting off power supplied to one or more remaining internal modules.

According to an embodiment, the at least one internal module related to the authorization of the external device may include at least one of an input module, a communication interface for transmitting the authorization information to the external device, or a power management module.

According to an embodiment, the cutting off of the power supplied may include if authorization information of the external device is stored in the second memory, cutting off power supplied to the first memory including a secure area; and if no authorization information of the external device exists in the second memory, maintaining power supplied to the secure area in the first memory, wherein the secure area may include at least a portion of the first memory for storing authorization information.

According to an embodiment, the transmitting of the authorization information may include checking whether or not a user input is detected; generating, based on the detection of the user input, authorization information corresponding to the external device; and transmitting the authorization information corresponding to the external device to the external device.

According to an embodiment, the transmitting of the authorization information may include generating authorization information corresponding to the external device in response to reception of a authorization request signal; and transmitting the authorization information corresponding to the external device to the external device.

An electronic device and an operating method thereof, according to an embodiment, may extend a usage time of a smart key service by, based on an occurrence of a low-power mode conversion event, cutting off power supplied to remaining modules, except for at least some modules corresponding to a smart key service, among a plurality of internal modules included in the electronic device.

An electronic device and an operating method thereof, according to an embodiment, can extend a usage time of a smart key service by, based on an occurrence of a low-power mode conversion event, converting the OS of the electronic device to a low-power OS.

An electronic device and an operating method thereof, according to an embodiment, may extend a usage time of a smart key service by, based on an occurrence of a low-power mode conversion event, by converting a processor of the electronic device to a low-power processor.

Figure 14:
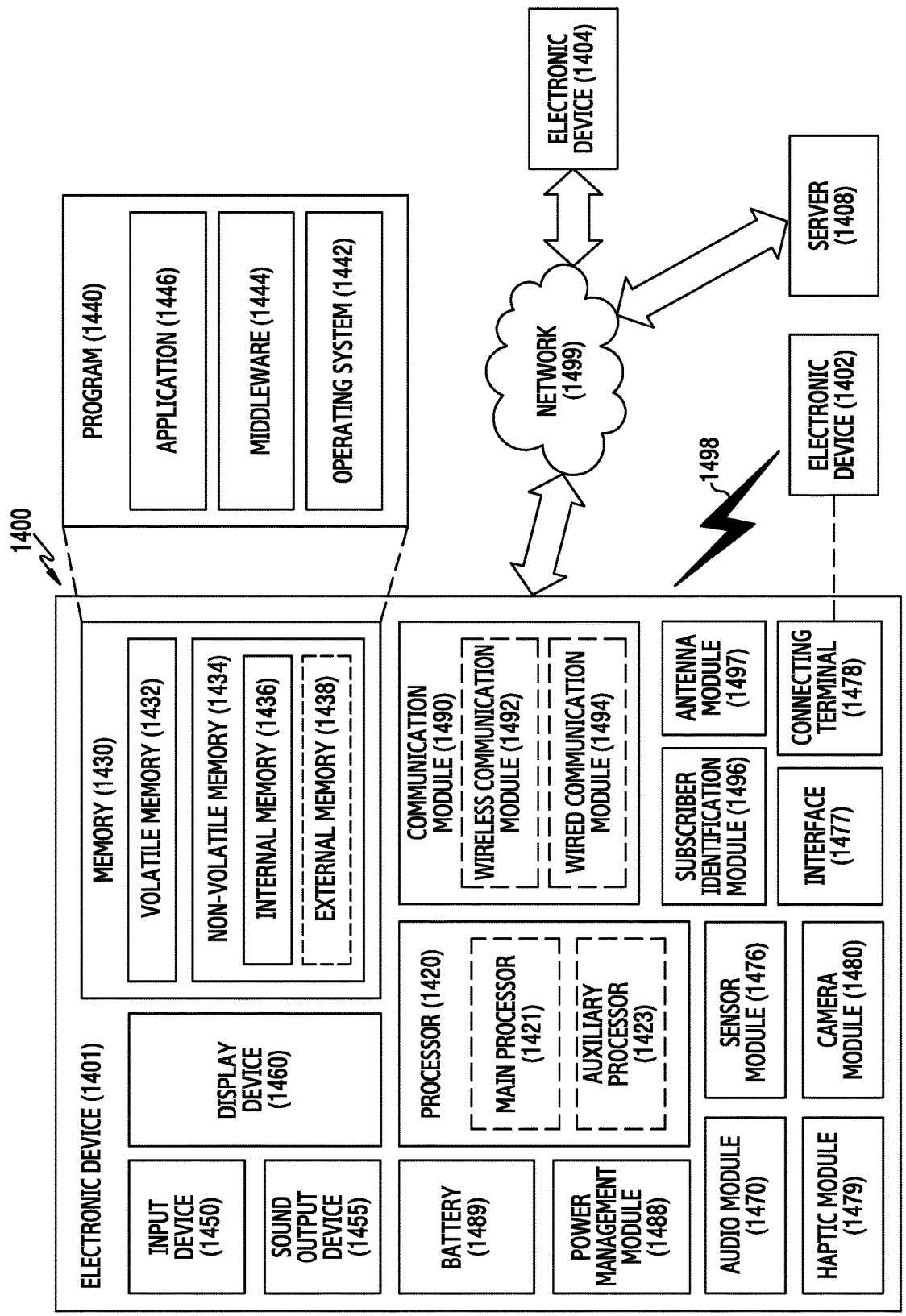
FIG. 14 is a block diagram of an electronic device in a network environment for providing a smart key service according to an embodiment.

FIG. 14 is a block diagram illustrating an electronic device 1401 in a network environment 1400 according to an embodiment.

Referring to FIG. 14, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). According to an embodiment, the electronic device 1401 may communicate with the electronic device 1404 via the server 1408. The electronic device 1401 may include a processor 1420 (e.g., the processor 220 of FIG. 2), memory 1430 (e.g., the memory 230 of FIG. 2), an input device 1450, a sound output device 1455, a display device 1460 (e.g., the display 250 of FIG. 2), an audio module 1470, a sensor module 1476, an interface 1477, a haptic module 1479, a camera module 1480, a power management module 1488, a battery 1489, a communication module 1490 (e.g., the communication interface 260 of FIG. 2), a SIM 1496, or an antenna module 1497. In an embodiment, at least one (e.g., the display device 1460 or the camera module 1480) of the components may be omitted from the electronic device 1401, or one or more other components may be added in the electronic device 1401. Some of the components may be implemented as single integrated circuitry. For example, the sensor module 1476 (e.g., a fingerprint sensor, an iris sensor, or an illuminance sensor) may be implemented as embedded in the display device 1460.

The processor 1420 may execute, for example, software (e.g., a program 1440) to control at least one other component (e.g., a hardware or software component) of the electronic device 1401 coupled with the processor 1420, and may perform various data processing or computation. According to one embodiment, as at least part of the data processing or computation, the processor 1420 may load a command or data received from another component (e.g., the sensor module 1476 or the communication module 1490) in volatile memory 1432, process the command or the data stored in the volatile memory 1432, and store resulting data in non-volatile memory 1434. The processor 1420 may include a main processor 1421 (e.g., a CPU or an AP), and an auxiliary processor 1423 (e.g., a GPU, an ISP, a sensor hub processor, or a CP) that is operable independently from, or in conjunction with, the main processor 1421. Additionally or alternatively, the auxiliary processor 1423 may be adapted to consume less power than the main processor 1421, or configured to a certain function. The auxiliary processor 1423 may be implemented separate from, or part of, the main processor 1421.

The auxiliary processor 1423 may control at least some functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an ISP or a CP) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an OS 1442, middleware 1444, or an application 1446.

The input device 1450 may receive a command or data to be used by another component (e.g., the processor 1420) of the electronic device 1401, from the outside (e.g., a user) of the electronic device 1401. The input device 1450 may include, for example, a microphone, a mouse, or a keyboard.

The sound output device 1455 may output sound signals to the outside of the electronic device 1401. The sound output device 1455 may include, for example, a speaker or a receiver. The speaker may be used for general purposes, such as playing multimedia or playing a record, and the receiver may be used for incoming calls. According to an embodiment, the receiver may be implemented to be separate from, or part of, the speaker.

The display device 1460 may visually provide information to the outside (e.g., a user) of the electronic device 1401. The display device 1460 may include, for example, a display, a hologram device, or a projector and control circuitry to control a corresponding one of the display, the hologram device, and the projector. According to an embodiment, the display device 1460 may include touch circuitry adapted to detect a touch, or sensor circuitry (e.g., a pressure sensor) adapted to measure the intensity of a force incurred by the touch.

The audio module 1470 may convert a sound into an electrical signal and vice versa. According to an embodiment, the audio module 1470 may obtain the sound via the input device 1450, or output the sound via the sound output device 1455 or a headphone of the electronic device 1402 directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more protocols to be used for the electronic device 1401 to be coupled with the external electronic device 1402 directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device 1402. According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or an electrical stimulus which may be recognized by a user via a tactile sensation or a kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, ISPs, or flashes.

The power management module 1488 may manage power supplied to the electronic device 1401. According to one embodiment, the power management module 1488 may be implemented as at least part of, for example, a PMIC.

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device 1402, the electronic device 1404, or the server 1408 and performing communication via the established communication channel. The communication module 1490 may include one or more CPs that are operable independently from the processor 1420 (e.g., the AP) and supports a direct (e.g., wired) communication or a wireless communication. According to an embodiment, the communication module 1490 may include a wireless communication module 1492 (e.g., a cellular communication module, a short-range wireless communication module, or a GNSS communication module) or a wired communication module 1494 (e.g., a LAN communication module or a power line communication (PLC) module). A corresponding one of these communication modules may communicate with the external electronic device 1402 via the first network 1498 (e.g., a short-range communication network, such as Bluetooth™, Wi-Fi direct, or an Infrared Data Association (IrDA) standard) or the second network 1499 (e.g., a long-range communication network, such as a cellular network, the Internet, or a computer network (e.g., a LAN or a wide area network (WAN)). These various types of communication modules may be implemented as a single component (e.g., a single integrated circuit (or chip)), or may be implemented as multiple components (e.g., multiple chips) separate from each other. The wireless communication module 1492 may identify and authenticate the electronic device 1401 in a communication network, such as the first network 1498 or the second network 1499, using subscriber information (e.g., IMSI) stored in the SIM 1496.

The antenna module 1497 may transmit or receive a signal or power to or from the outside (e.g., the external electronic device) of the electronic device 1401. According to an embodiment, the antenna module 1497 may include one or more antennas, and, therefrom, at least one antenna appropriate for a communication scheme used in the communication network, such as the first network 1498 or the second network 1499, may be selected, for example, by the communication module 1490 (e.g., the wireless communication module 1492). The signal or the power may then be transmitted or received between the communication module 1490 and the external electronic device via the selected at least one antenna.

At least some of the above-described components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to an embodiment, commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. All or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

Figure 15:
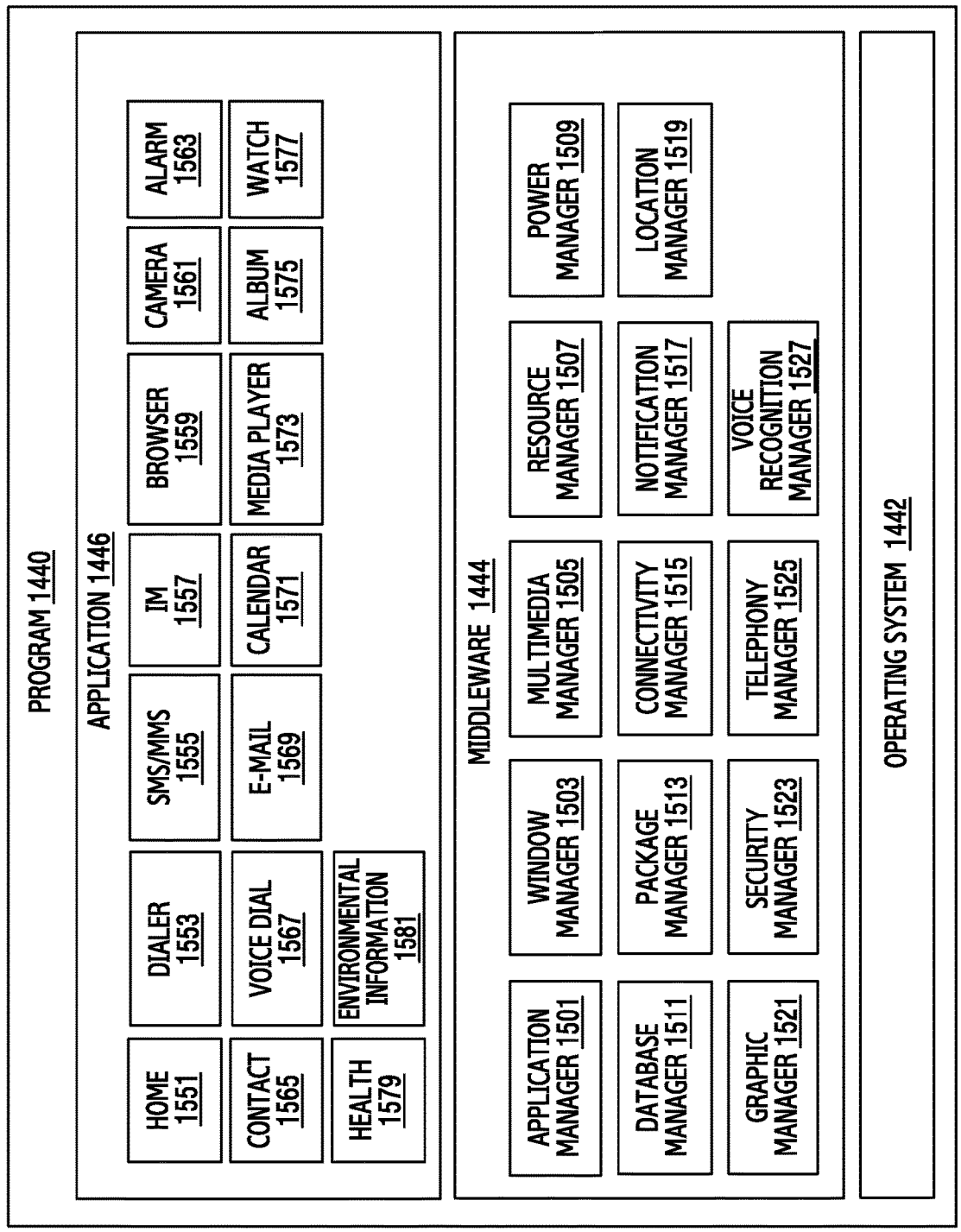
FIG. 15 is a block diagram of a program according to an embodiment.

FIG. 15 is a block diagram illustrating the program 1440 according to an embodiment.

Referring to FIG. 15, the program 1440 may include an OS 1442 to control one or more resources of the electronic device 1401, middleware 1444, or an application 1446 executable in the OS 1442. The OS 1442 may include, for example, Android™, iOS™, Windows™, Symbian™, Tizen™, or Bada™. At least part of the program 1440, for example, may be pre-loaded on the electronic device 1401 during manufacture, or may be downloaded from or updated by an external electronic device (e.g., the electronic device 1402 or 1404, or the server 1408) during use by a user.

The OS 1442 may control management (e.g., allocating or deallocation) of one or more system resources (e.g., a process, memory, or a power source) of the electronic device 1401. The OS 1442, additionally or alternatively, may include one or more driver programs to drive other hardware devices of the electronic device 1401, for example, the input device 1450, the sound output device 1455, the display device 1460, the audio module 1470, the sensor module 1476, the interface 1477, the haptic module 1479, the camera module 1480, the power management module 1488, the battery 1489, the communication module 1490, the SIM 1496, or the antenna module 1497.

The middleware 1444 may provide various functions to the application 1446 such that a function or information provided from one or more resources of the electronic device 1401 may be used by the application 1446. The middleware 1444 may include, for example, an application manager 1501, a window manager 1503, a multimedia manager 1505, a resource manager 1507, a power manager 1509, a database manager 1511, a package manager 1513, a connectivity manager 1515, a notification manager 1517, a location manager 1519, a graphic manager 1521, a security manager 1523, a telephony manager 1525, or a voice recognition manager 1527.

The application manager 1501, for example, may manage the life cycle of the application 1446. The window manager 1503, for example, may manage one or more graphical user interface (GUI) resources that are used on a screen. The multimedia manager 1505, for example, may identify one or more formats to be used to play media files, and may encode or decode a corresponding one of the media files using a codec appropriate for a corresponding format selected from the one or more formats. The resource manager 1507, for example, may manage source code of the application 1446 or a memory space of the memory 1430. The power manager 1509, for example, may manage the capacity, temperature, or power of the battery 1489, and determine or provide related information to be used for the operation of the electronic device 1401 based at least in part on corresponding information of the capacity, temperature, or power of the battery 1489. According to an embodiment, the power manager 1509 may interwork with a basic input/output system (BIOS) of the electronic device 1401.

The database manager 1511, for example, may generate, search, or change a database to be used by the application 1446. The package manager 1513, for example, may manage an installation or an update of an application that is distributed in the form of a package file. The connectivity manager 1515, for example, may manage a wireless connection or a direct connection between the electronic device 1401 and the external electronic device. The notification manager 1517, for example, may provide a function to notify a user of an occurrence of a certain event (e.g., an incoming call, a message, or an alert). The location manager 1519, for example, may manage location information on the electronic device 1401. The graphic manager 1521, for example, may manage one or more graphic effects to be offered to a user or a user interface related to the one or more graphic effects.

The security manager 1523, for example, may provide system security or user authentication. The telephony manager 1525, for example, may manage a voice call function or a video call function provided by the electronic device 1401. The voice recognition manager 1527, for example, may transmit a user's voice data to the server 1408, and receive, from the server 1408, a command corresponding to a function to be executed on the electronic device 1401 based at least in part on the voice data, or text data converted based at least in part on the voice data. According to an embodiment, the middleware 1544 may dynamically delete some existing components or add new components. At least part of the middleware 1444 may be included as part of the OS 1442 or may be implemented as another software separate from the OS 1442.

The application 1446 may include, for example, a home application 1551, a dialer application 1553, a short message service (SMS)/multimedia messaging service (MMS) application 1555, an instant message (IM) application 1557, a browser application 1559, a camera application 1561, an alarm application 1563, a contact application 1565, a voice recognition application 1567, an email application 1569, a calendar application 1571, a media player application 1573, an album application 1575, a watch application 1577, a health application 1579 (e.g., for measuring the degree of a workout or biometric information, such as blood sugar level), or an environmental information application 1581 (e.g., for measuring air pressure, humidity, or temperature information). According to an embodiment, the application 1446 may further include an information exchanging application that is capable of supporting information exchange between the electronic device 1401 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a certain event (e.g., receipt of an email) at another application (e.g., the email application 1569) of the electronic device 1401 to the external electronic device. Additionally or alternatively, the notification relay application may receive notification information from the external electronic device and provide the notification information to a user of the electronic device 1401.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, deletion, or updating an application running on the external electronic device.

The electronic device according to an embodiment may be one of various types of electronic devices. The electronic devices may include, for example, a portable communication device (e.g., a smart phone), a computer, a portable multimedia device, a portable medical device, a camera, a wearable device, or a home appliance. However, the electronic devices of the present disclosure are not intended to be limited to those devices described above.

It should be appreciated that various embodiments of the present disclosure and the terms used therein are not intended to limit the present disclosure but include various changes, equivalents, or replacements. With regard to the description of the accompanying drawings, similar reference numerals may be used to refer to similar or related elements. It should be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "1$^{st}$," "2nd," "first," and "second" may be used to simply distinguish a corresponding component from another, but does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may be used interchangeably with other terms, for example, "logic," "logic block," "part," or "circuitry". The term "module" may indicate a single integral component, or a minimum unit or part thereof, adapted to perform one or more functions. For example, according to an embodiment, the term "module" may indicate a device implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include code generated by a complier or code executable by an interpreter. A non-transitory machine-readable storage medium may be provided in the form of a non-transitory storage medium. Wherein, the term "non-transitory" simply indicates that the storage medium is a tangible device, but does not include a signal (e.g., an electromagnetic wave), and this term does not differentiate between where data is semi-permanently stored in the storage medium and where the data is temporarily stored in the storage medium.

According to an embodiment, a method according to an embodiment of the present disclosure may be included and provided in a computer program product. The computer program product may be traded as a product between a seller and a buyer. The computer program product may be distributed in the form of a non-transitory machine-readable storage medium (e.g., a compact disc read only memory (CD-ROM)), or distributed (e.g., downloaded or uploaded) online via an application store (e.g., Play Store™) or between two user devices (e.g., smart phones) directly. If distributed online, at least part of the computer program product may be temporarily generated or at least temporarily stored in the non-transitory machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:

1. An electronic device, comprising:
a first memory configured to store authorization information;
a first processor configured to access the first memory;
a second memory; and
a second processor configured to access the second memory,
wherein the first processor is configured to:
identify state information related to a battery state of the electronic device while the electronic device is in a first state;
if the state information satisfies a first condition, provide authorization information to an external device so that the external device performs authorization using the authorization information; and
if the state information satisfies a second condition, copy the authorization information into the second memory and convert the electronic device to a second state in which power consumption thereof is less than that in the first state, and
wherein the second processor is configured to provide the authorization information to the external device, in the second state, so that the external device performs authorization using the authorization information.

2. The electronic device of claim 1, wherein the first processor is further configured to:
if the state information satisfies the second condition, store at least one application related to the authorization in the second memory; and
execute the at least one application using the second processor.

3. The electronic device of claim 1, further comprising a communication interface configured to transmit authorization information to the external device, wherein the second memory further comprises driving data on the communication interface.

4. The electronic device of claim 1, wherein the first processor is further configured to determine that the second condition is satisfied when remaining power of a battery of the electronic device is less than a predefined reference value.

5. The electronic device of claim 1, wherein the first processor is further configured to be operated based on a first operating system, and wherein the second processor is configured to be operated based on a second operating system having power consumption less than that of the first operating system.

6. The electronic device of claim 1, wherein the second processor is further configured to:

maintain power supplied to at least one internal module related to authorization of the external device, among a plurality of internal modules included in the electronic device; and cut off power supplied to one or more remaining internal modules among the plurality of internal modules in the electronic device.

7. The electronic device of claim 6, wherein the at least one internal module related to the authorization of the external device comprises at least one of an input module, a communication interface for transmitting authorization information to the external device, and a power management module.

8. The electronic device of claim 1, wherein the second processor is further configured to:

check whether or not a user input is detected;

generate, based on the detection of the user input, authorization information corresponding to the external device; and transmit the authorization information corresponding to the external device to the external device.

9. The electronic device of claim 1, wherein the second processor is further configured to:

generate authorization information corresponding to the external device in response to reception of a authorization request signal; and transmit the authorization information corresponding to the external device to the external device.

* * * * *